United States Patent [19]
Murayama et al.
[11] Patent Number: 5,077,573
[45] Date of Patent: Dec. 31, 1991

[54] PHOTOCOMPOSING METHOD AND SYSTEM THEREFOR

[75] Inventors: Minoru Murayama; Kazuhiko Ito; Takeji Hashimoto; Masayuki Tokuda, all of Kyoto, Japan

[73] Assignee: Dainippon Screen Mfg. Co. Ltd.

[21] Appl. No.: 651,571

[22] Filed: Feb. 6, 1991

[30] Foreign Application Priority Data

Feb. 6, 1990 [JP] Japan .................................... 2-26877
Apr. 27, 1990 [JP] Japan .................................... 2-112006

[51] Int. Cl.[5] ........................ G03B 27/52; G03B 27/32
[52] U.S. Cl. .......................................... 355/40; 355/54
[58] Field of Search ............................ 355/40, 54, 244

[56] References Cited

U.S. PATENT DOCUMENTS 4,150,991 4/1979 Dillow .............................. 355/40 X
4,231,659 11/1980 Logan .............................. 355/54 X
4,397,543 8/1983 Kolbe et al. .......................... 355/40
4,963,919 10/1990 Matsumoto et al. .................. 355/40
5,003,343 3/1991 Hackenberg et al. ............ 355/40 X

*Primary Examiner*—Richard A. Wintercorn
*Attorney, Agent, or Firm*—Ostrolenk, Faber, Gerb & Soffen

[57] ABSTRACT

Plural images and plural register marks are printed on a photosensitive material with an original plate including an original image and register marks. Two kinds of masks are prepared before the printing: a photocomposing mask for masking the original image and the register marks on the original plate, and an exposing-out mask for masking the images and the register marks on the photosensitive material. First, the plural images and the register marks are printed on the photosensitive material while overlaying the original plate with the photocomposing mask by a photocomposer. Secondly, the photosensitive material is exposed with the exposing-out mask overlaid. Even if the plural images complementary are to each other, the total procedure can be performed easily while using the two masks. The two masks can be fabricated easily on the basis of the shape of the original image and of the positions and orientations of the plural images on the photosensitive material.

20 Claims, 22 Drawing Sheets

PHOTOCOMPOSING METHOD AND SYSTEM THEREFOR

BACKGROUND OF THE INVENTION

1. Field of the Invention

The present invention relates to a method of and a system useful for exposing plural images on a photosensitive material with a photocomposer.

2. Description of the Prior Art

A photocomposer is an apparatus well known in the art for exposing plural images of an original film on a photosensitive material, such as a presensitized plate. In photocomposing operation, the arrangement of the images is planned so that as many images as possible can be printed with a single printing plate made from the photosensitive material.

FIG. 1A is a diagram showing a printing plate on which plural images are printed by exposure. FIG. 1B is a diagram showing an original film OF including an original image OI. On the printing plate PP, four identical images Ia–Id of the original image OI are printed. The images Ic and Id are oriented inversely of the images Ia and Ib and are complementary to the same.

One type of automatic photocomposer is provided with an automatic masking device for masking areas other than the image areas in exposing operation. FIG. 1A shows a window W of the automatic masking device for exposing the image Ia. The automatic masking device has four masking plates at its four sides respectively, which move to change the shape and size of the window W. The window W is therefore a rectangle. The area of the photosensitive material within the window W is to be exposed while the other area is masked.

When the images Ia and Ic are complementary to each other, as shown in FIG. 1A, the window W includes a partial area Rc1 of the image Ic in some cases. If the image Ia is printed by exposure while the window W is set as shown in FIG. 1A, the partial area Rc1 is also exposed while the image Ic is to be printed later. Incidentally, when a printing plate is made from a photosensitive material of positive type, printing ink is not put on the exposed areas, but is put on non-exposed areas. Accordingly, since the partial area Rc1 is exposed along with image Ia, printing ink is not put on the partial area Rc1 even though the image Ic is printed later.

This problem is not solved by forming the window W to be a rectangle circumscribed about an image in the case where circumscribed rectangles of plural images overlap each other. In order to cope with the problem, in the prior art, a mask made of a peel film (hereinafter referred to as "film mask") FM is prepared and overlaid on the original film OF so that the film mask FM masks the partial area Rc1 (FIGS. 1A and 1B).

However, the masking part of the film mask FM and its position on the original film OF are required to be changed according to the shape and the arrangement of the images Ia-Id. Therefore a considerably skilled worker is needed to decide the masking part and its position on the original film OF.

SUMMARY OF THE INVENTION

Accordingly, an object of the present invention is to provide a method of and a system useful for photocomposing images, especially complementary images, without a skilled worker.

The present invention is directed to a method of printing a plurality of duplicated images of an original image and a plurality of duplicated register marks on a photosensitive material, comprising the steps of:(a) preparing an original plate having an original image and a register mark;(b) specifying positions and orientations of the plurality of duplicated images to be printed on the photosensitive material with the original plate;(c) fabricating a first mask for masking a first masking area other than printing areas on the original plate, the printing areas including at least the original image and the register mark, (d) fabricating a second mask for masking second masking areas including at least the plurality of duplicated images and the plurality of duplicated register marks on the photosensitive material;(e) printing the plurality of duplicated images and the plurality of duplicated register marks on the photosensitive material according to the positions and orientations while overlaying the original plate with the first mask; and (f) exposing the photosensitive material while overlaying the photosensitive material with the second mask, thereby exposing an area on the photosensitive material other than the second masking areas.

Preferably, the plurality of duplicated images are so arranged on the photosensitive material that a plurality of rectangles circumscribed about respective duplicated images overlap partly with each other.

The step (a) may comprise a step of producing a first mask data representing masking portions of the first mask; the step (b) may comprise a step of producing a composing data representing the positions and orientations of the plurality of duplicated images; and in the step (d), the second mask may be fabricated on the basis of the first mask data and the composing data.

Further, the step (e) may be performed on the basis of the composing data with a photocomposing apparatus which sets the original plate according to each of the positions and orientations of the plurality of duplicated images on the photosensitive material at each step of photocomposing.

Moreover, the original plate may have four register marks on four sides of the original image, respectively; the photocomposing apparatus may comprise a masking device having four mask plates movable separately to adjust an aperture therein; the original plate may be so set in the photocomposing apparatus that each of the four register marks are shieldable by respective four mask plates; and the step (e) may be performed while a piece of the four register marks, which is located at a position to come between the plurality of duplicated images, is shielded by a corresponding mask plate of the masking device at each step of photocomposing.

In addition, the printing areas may include an image printing area formed by expanding an area of the original image by a first width, and register-mark printing areas formed by expanding respective areas of the four register marks by a second width; and the second masking areas may include image masking areas formed by expanding respective areas of the plurality of duplicated images by a third width, and register-mark masking areas formed by expanding respective areas of the plurality of duplicated register marks by a fourth width.

Further, each of the duplicated images may be an image to be printed on paper-ware, and layout of developments of the paper-ware may be specified on the photosensitive material in the step (b).

The second mask may include number-masking areas each of which is located at a prescribed position adjoining the corresponding image masking area, and which represents different numbers from each other.

The present invention is also directed to a system useful for printing a plurality of duplicated images of an original image and a plurality of duplicated register marks of a register mark on a photosensitive material with an original plate having the original image and the register mark, comprising: arrangement means for specifying positions and orientations of the plurality of duplicated images on the photosensitive material; first-mask-data production means for producing first mask data representing a first mask for masking a first masking area other than printing areas on the original plate, the printing areas including at least the original image and the register mark; second-mask-data production means for producing second mask data representing a second mask for masking second masking areas including at least the plurality of duplicated images and the plurality of duplicated register marks to be printed on the photosensitive material; and composing-data production means for producing composing data representing the positions and orientations of the plurality of duplicated images.

Preferably, the first mask data production means expands an area of the original image by a first width to make up an image printing area, and expands respective areas of the register mark by a second width to make up a register-mark printing area, thereby producing the first mask data representing the first mask area other than the image printing areas and the register-mark printing area; and the second mask data production means expands respective areas of the plurality of duplicated images by a third width to make up the image masking areas, and expand respective areas of the plurality of duplicated register marks by a fourth width to make up the register-mark masking areas, thereby producing the second mask data representing the second mask areas including the image masking areas and the register-mark masking areas.

The system may comprise mask fabrication means for fabricating the first mask and the second mask according to the first mask data and the second mask data, respectively.

The system may further comprise photocomposing means for printing the plurality of duplicated images and the plurality of duplicated register marks on the photosensitive material on the basis of the composing data while overlaying the original plate with the first mask.

The photocomposing means may comprises a masking device having four mask plates movable separately to adjust an aperture therein, through which aperture the original plate is exposed.

The system may still further comprise exposing-out means for exposing the photosensitive material while overlaying the photosensitive material with the second mask, thereby exposing an area on the photosensitive material other than the second masking areas.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
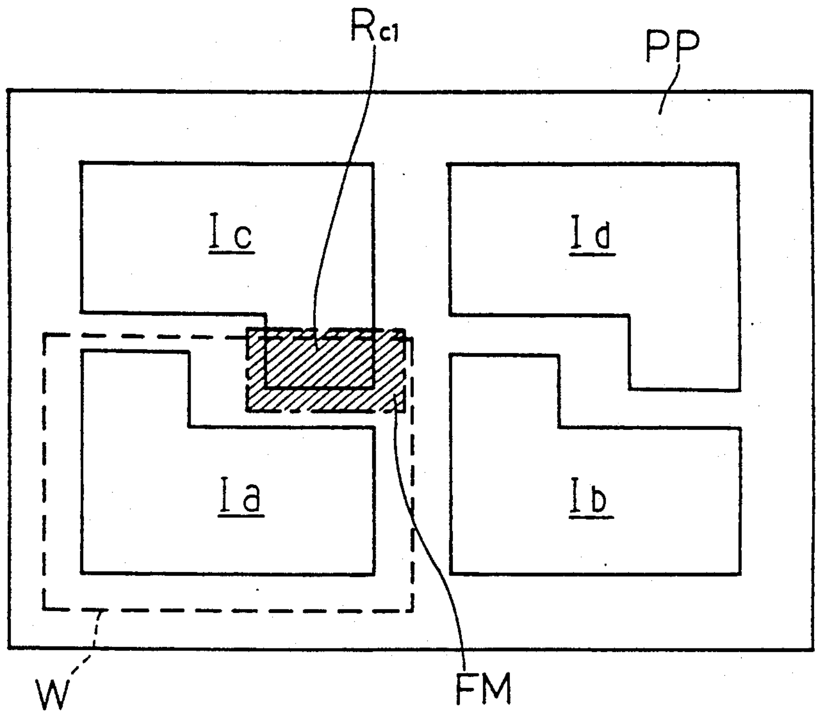
Fig. 1A (PRIOR ART)
FIGS. 1A and 1B are diagrams showing a printing plate and a mask in the prior art.
Figure 1B:
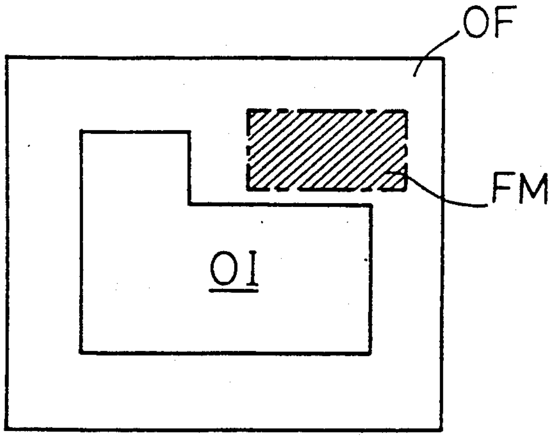
Fig. 1B (PRIOR ART)
Figure 2A:
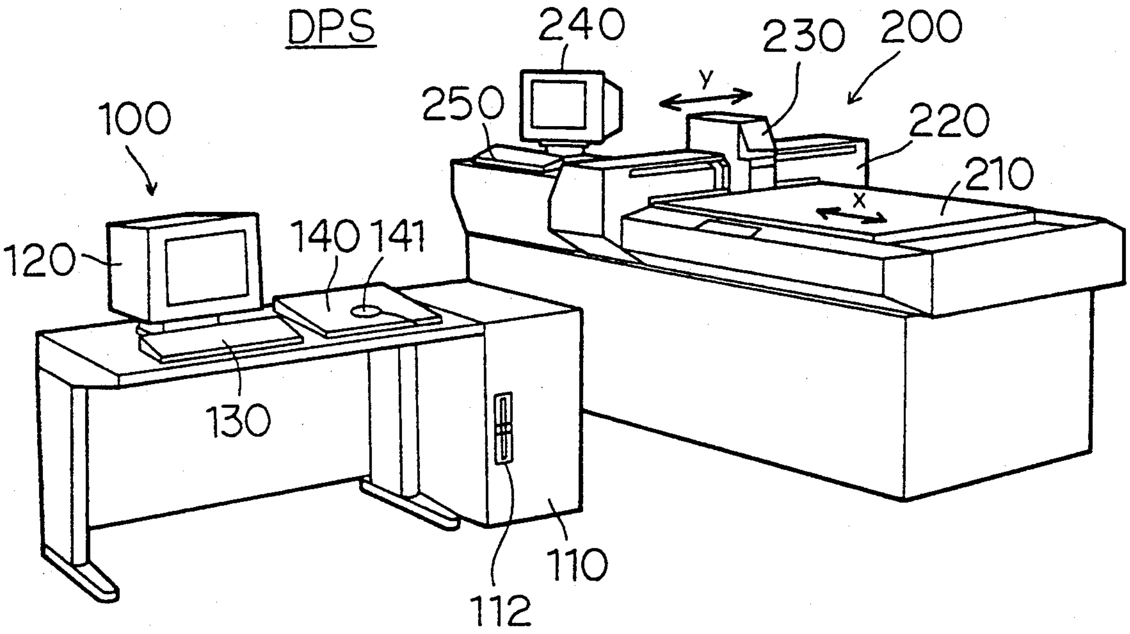
FIG. 2A is a perspective view of a paper-ware design system for fabricating a mask according to the present invention.

FIG. 2A is a perspective view of a paper-ware design system for producing masks and photocomposing data used in photocomposing operation according to a preferred embodiment of the present invention. The paper-ware design system DPS has a design work station 100 and a sample-cutting and drawing machine 200.

Figure 2B:
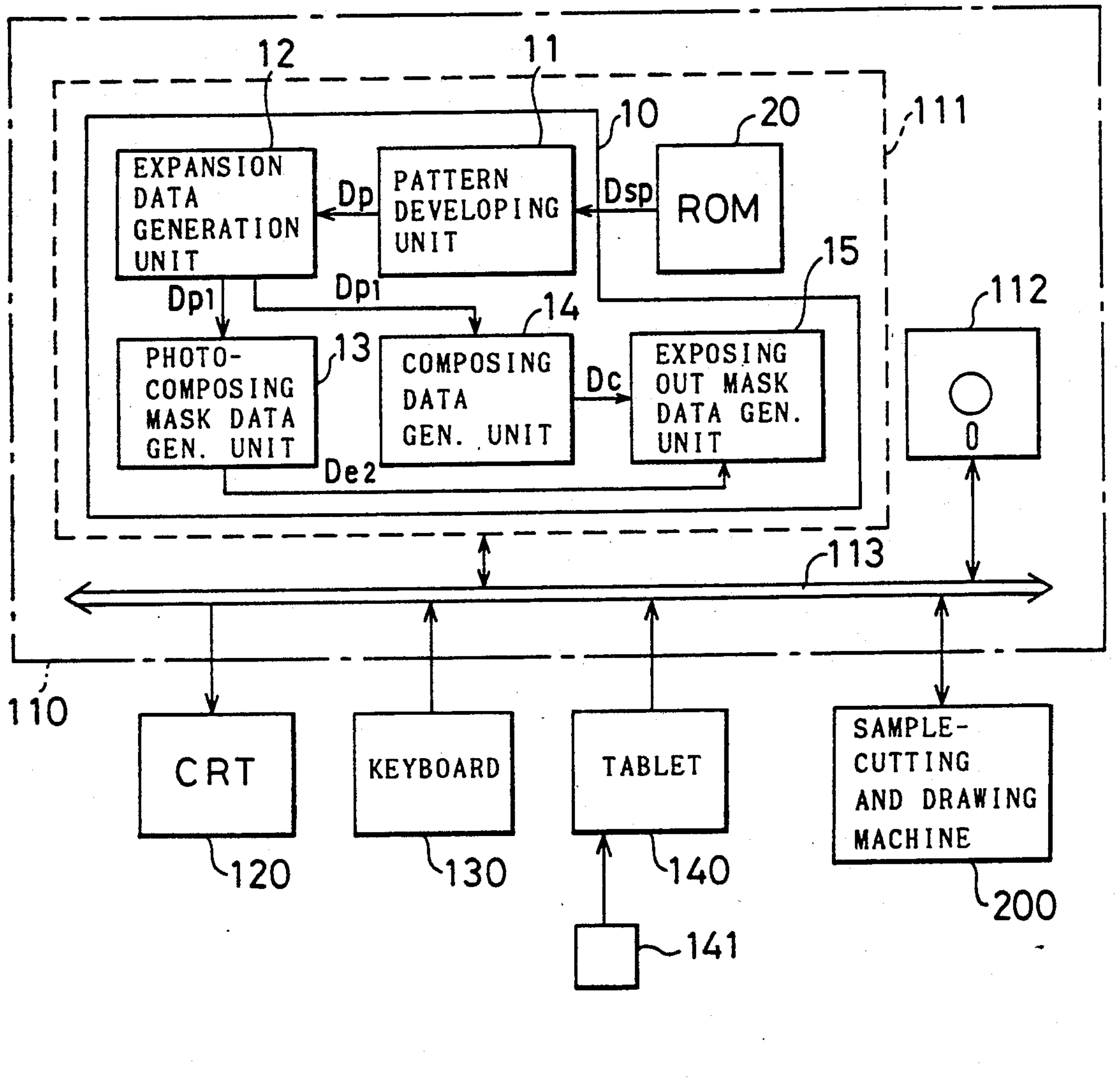
FIG. 2B is a block diagram of the paper-ware design system.

The design work station 100 comprises a control unit 110, a CRT 120, a keyboard 130, and an input tablet 140. The control unit 110 includes a magnetic hard disc drive (not shown) and a floppy disc drive 112 in addition to a microcomputer 111 (FIG. 2B). The input tablet 140 is provided with a menu sheet thereon (not shown), on which a process menu is assigned to be selected with a mouse 141. A designer of paper-ware, such as paper packages, uses the work station to design developments of paper-ware, shapes of image areas to be printed on the paper-ware, and arrangement of the images on a printing plate.

The sample-cutting and drawing machine 200 has a moving table 210, on which a drawing paper or a peel film is mounted. The moving table 210 is driven in an x direction by a motor not shown in the figure. Over the moving table is provided a supporting beam 220, to which a head mechanism 230 is secured to be movable in a y direction. The sample-cutting and drawing machine 200 can make a drawing and fabricate film masks on the basis of data produced by the design work station 100.

When the machine 200 makes a drawing, a drawing paper is mounted on the moving table 210 and drawing pens are fixed in the head mechanism 230. When the machine 200 fabricates film masks by peeling off a part of a peel film, a peel film is mounted on the moving table 210 and a cutter is fixed in the head mechanism 230. With a cutter, the machine can also cut a sample of paper-ware.

The sample-cutting and drawing machine 200 also comprises a CRT 240 and a keyboard 250, with which an operator can input necessary operation data.

FIG. 2B is a block diagram showing electrical structure of the paper-ware design system DPS. The control unit 110 of the design work station comprises a microcomputer 111 and a floppy disc drive 112, both of which are connected through a bus line 113 to the CRT 120, the keyboard 130, the tablet 140, and the sample-cutting and drawing machine 200.

The microcomputer 111 comprises a CPU 10, a ROM 20, and a RAM (not shown). The CPU 10 comprises a pattern developing unit 11, an expansion data generating unit 12, a photocomposing mask data generating unit 13, a composing data generating unit 14, and an exposing-out mask data generating unit 15. These units 11–15 are formed by software loaded in the CPU 10.

Figure 3:
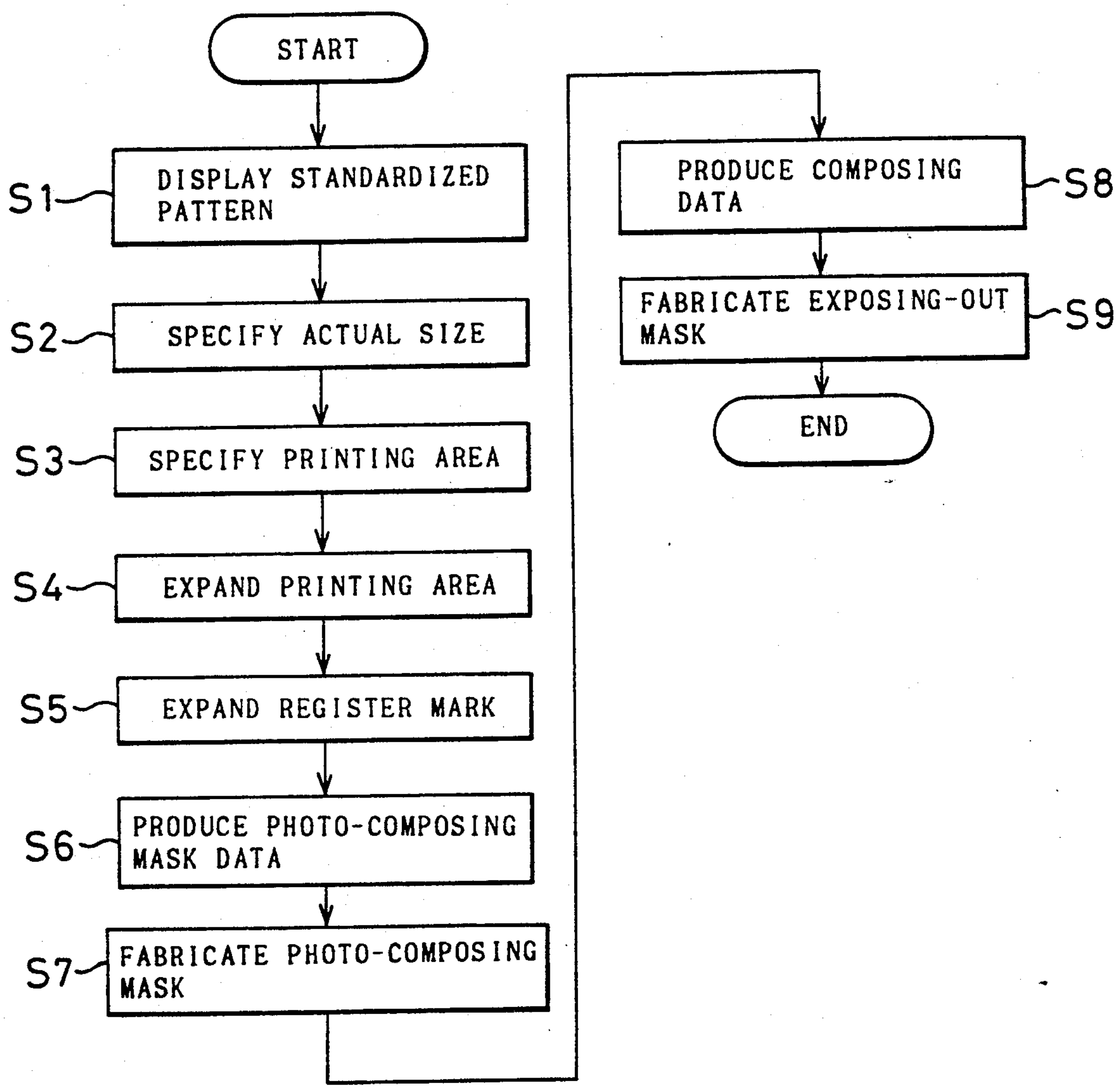
FIG. 3 is a flow chart of the procedure of fabricating a mask.

FIG. 3 is a flow chart showing the procedure of producing masks and composing data to be used in a photocomposing operation. FIGS. 4A through 4E schematically illustrates figures processed in this procedure.

Figure 4A:
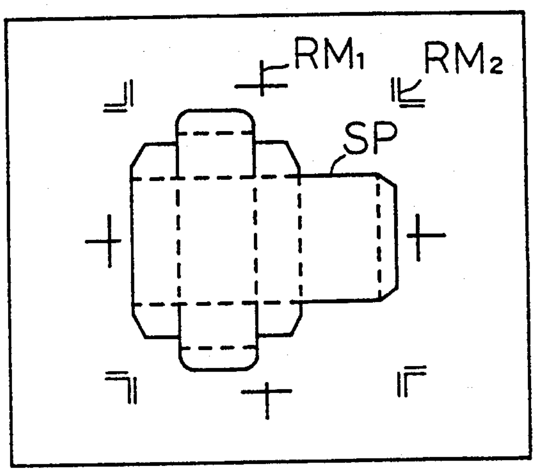
FIGS. 4A through 4E schematically illustrate figures treated in the process shown in FIG. 3.
Figure 4B:
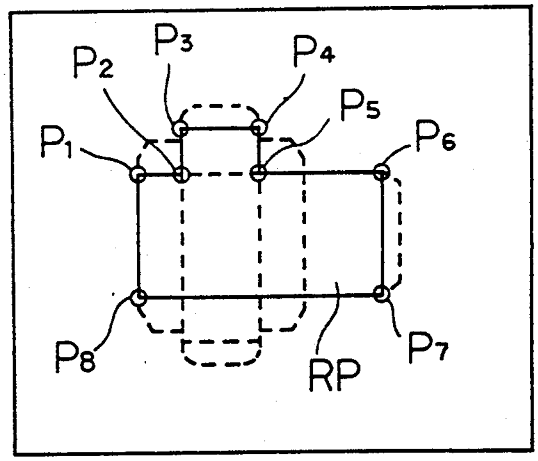

At a step S1, an operator commands with the tablet 140 and the mouse 141 to read out data representing a standardized pattern of paper-ware from the ROM 20 and to display a development of the standardized pattern on the CRT 120. FIG. 4A illustrates a development of a standardized pattern SP thus displayed. The ROM 20 memorizes plural types of standardized pattern data representing shapes of paper-ware, and one of these data is selected by an operator.

Figure 5A:
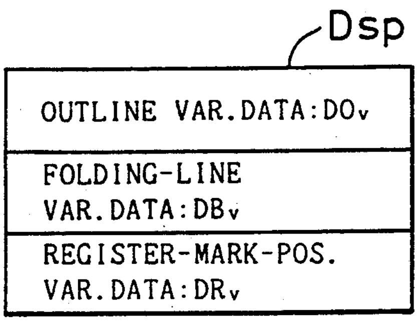
FIGS. 5A through 5C schematically illustrate data produced by the paper-ware design system.

FIG. 5A schematically illustrates the structure of the standardized pattern data Dsp. The standardized pattern data Dsp includes outline variable data DOv representing an outline of paper-ware, folding-line-variable data DBv representing positions of folding lines, and register-mark-position variable data DRv representing positions and shapes of register marks. In the standardized pattern data Dsp, dimensions of parts of the paper-ware, such as widths and lengths of side planes, widths of folding margins, and radii of corners, are expressed in terms of variables. Actual dimensions and positions are to be specified in the next step.

In FIG. 4A, outlines of the standardized pattern SP are drawn with solid lines, and folding lines with broken lines. Register marks RM1 and RM2 are also drawn in this figure as well as the standardized pattern SP. The register marks RM1 are center register marks, and the intersection of the cross of each mark is placed at a central position of the standardized patter SP in the vertical or horizontal direction, and is positioned at a prescribed distance from the outline of the standardized pattern SP.

Figure 5B:
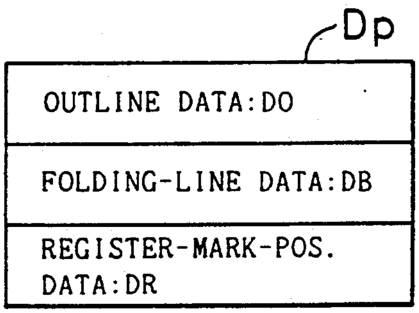

At a step S2, an operator specifies actual size of each parts of the standardized pattern SP with the keyboard 130, the tablet 140, and the mouse 141. The pattern developing unit 11 produces development pattern data of paper-ware in accordance with the specified size, and displays the development on the CRT 120 in proportion to the actual size. FIG. 5B schematically illustrates the structure of development pattern data Dp produced by the pattern developing unit 11. The development pattern data Dp includes outline data DO, folding-line data DB, and register-mark-position data DR, each of which represents actual dimensions.

At a step S3, an operator specifies a printing area of paper-ware while watching the development displayed on the CRT 120. This operation is performed by designating positions of the vertexes P1–P8 of the printing area RP shown in FIG. 4B with the mouse 141. The shape and the position of the printing area RP are represented by printing area data comprising positional data of the vertexes P1–P8. The printing area data is added to the development pattern data Dp.

Figure 4C:
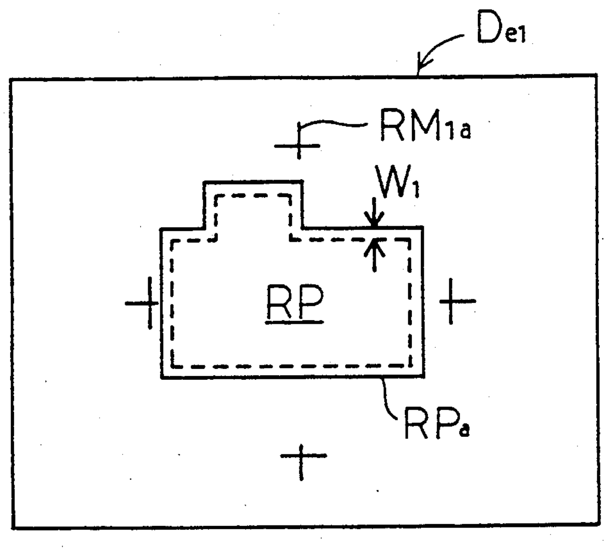

At a step S4, the expansion data generating unit 12 expands the printing area RP by a prescribed width W1, and generates data representing the expanded printing area RPa (hereinafter referred to as "expanded printing area data"). FIG. 4C illustrates the expanded printing area RPa. The value of the width W1 is inputted by an operator with the keyboard 130. Usually the width W1 is from 3 to 5 millimeters.

In the printing process, the expanded printing area RPa is filled with an image. The printing area is expanded as above so that the quality of the paper-ware is not deteriorated even if the cutting position of the printed paper—the final paper-ware is cut out from the printed paper—is somewhat displaced from that of the printing area.

Figure 5C:
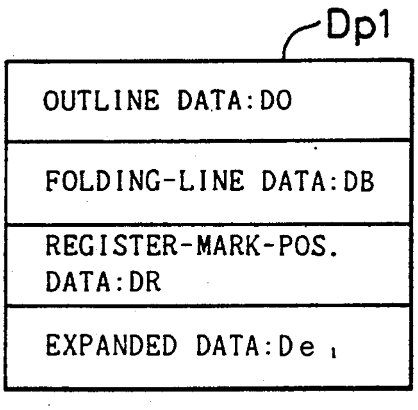

At a step S5, the register marks RM1 which are used in registering the original plate (original film) in the original film holder of the photocomposer are expanded by a prescribed width, and data representing the expanded register marks RM1a (hereinafter referred to as "expanded register mark data") are produced. The width of expansion is preferably about 0.3 mm. FIG. 4C illustrates expanded center register marks RM1a as well as the expanded printing area RPa. The expanded register mark data is added to the development pattern data Dp along with the expanded printing area data. FIG. 5C schematically illustrates the development pattern data Dp1 including the expanded printing area data and the expanded register mark data.

At a step S6, the photocomposing mask data generating unit 13 produces data De2 representing the shape of the photocomposing mask (hereinafter referred to as "composing mask data") on the basis of expanded data De1 of the development pattern data Dp1. The composing mask is a mask which is overlaid on an original film in a photocomposing operation with the photocomposer. The shape of the photocomposing mask is obtained by further expanding the expanded center register marks RM1a shown in FIG. 4C by a prescribed width (about 0.2 mm for example). The expansion operation is performed to prevent undesired lines along the center register marks when positional mismatch occurs between the photocomposing mask and an exposing-out mask described later. This expansion operation, however, can be omitted.

Figure 4D:
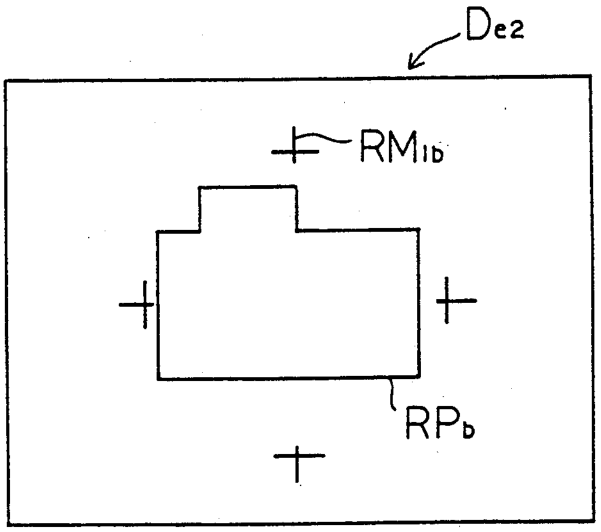

FIG. 4D shows a printing area RPb and center register marks RM1b represented by the photocomposing mask data De2.

Figure 4E:
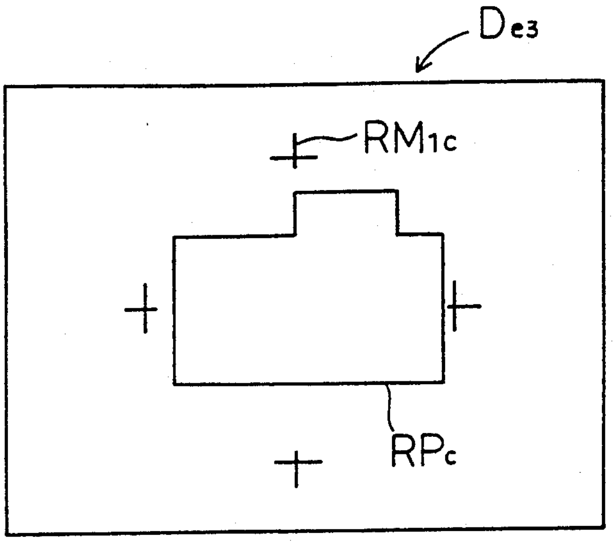

At a step S7, the photocomposing mask data De2 is supplied to the sample-cutting and drawing machine 200, and a photocomposing mask is produced therein. The sample-cutting and drawing machine 200 first produces an inverted expanded data representing inverted shapes of the printing area RPb and the register marks RM1b shown in FIG. 4D. FIG. 4E schematically illustrates a printing area RPc and center register marks RM1c represented by the inverted expanded data De3. The sample-cutting and drawing machine 200 cuts a red thin layer of a peel film mounted on the moving table 210 along outlines of the inverted printing area RPc and the center register marks RM1c. The peel film is a two-layered film consisting of the red thin film and a transparent base film. The red thin film is opaque with respect to exposing light of the photocomposer and the other exposing machine. An operator peels off the part of the red thin layer in the printing area RPc and the center register marks RM1c, whereby a photocomposing mask is completed.

Figure 6A:
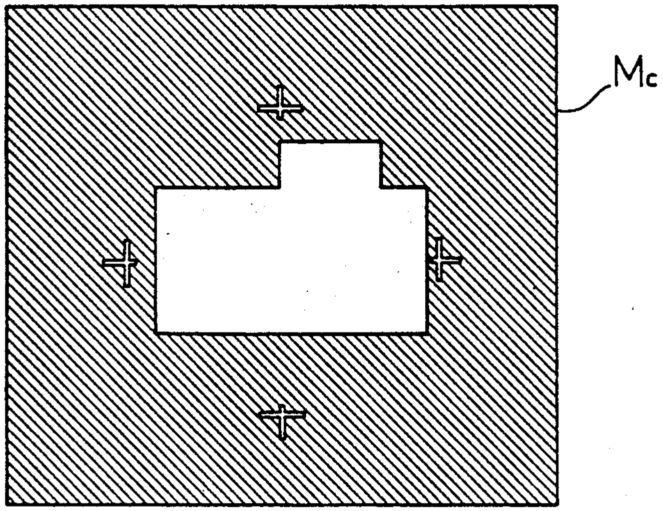
FIGS. 6A and 6B are plan views showing photocomposing masks.
Figure 6B:
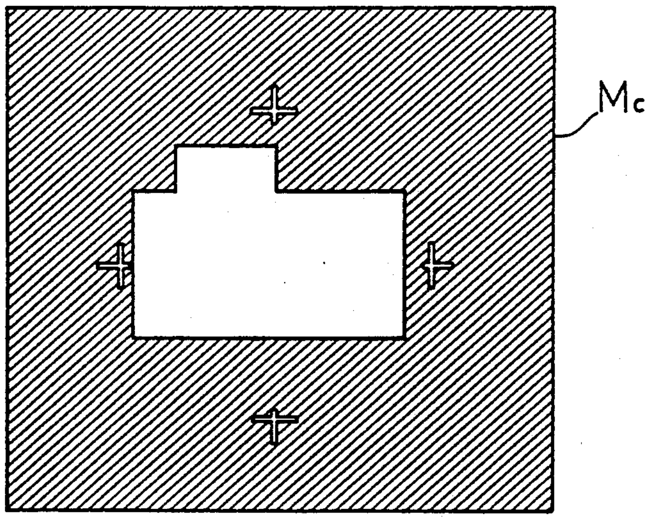

FIG. 6A is a plan view of the photocomposing mask Mc thus fabricated. When an original film and the photocomposing mask Mc is set in a photocomposer, the photocomposing mask Mc is inverted as shown in FIG. 6B so that its film surface (the surface having the red thin layer) is directed downward, and is overlaid on a film surface of the original film. The sample-cutting and drawing machine 200 fabricates the photocomposing mask Mc in the upside-down state as shown in FIG. 6A accordingly.

Figure 7:
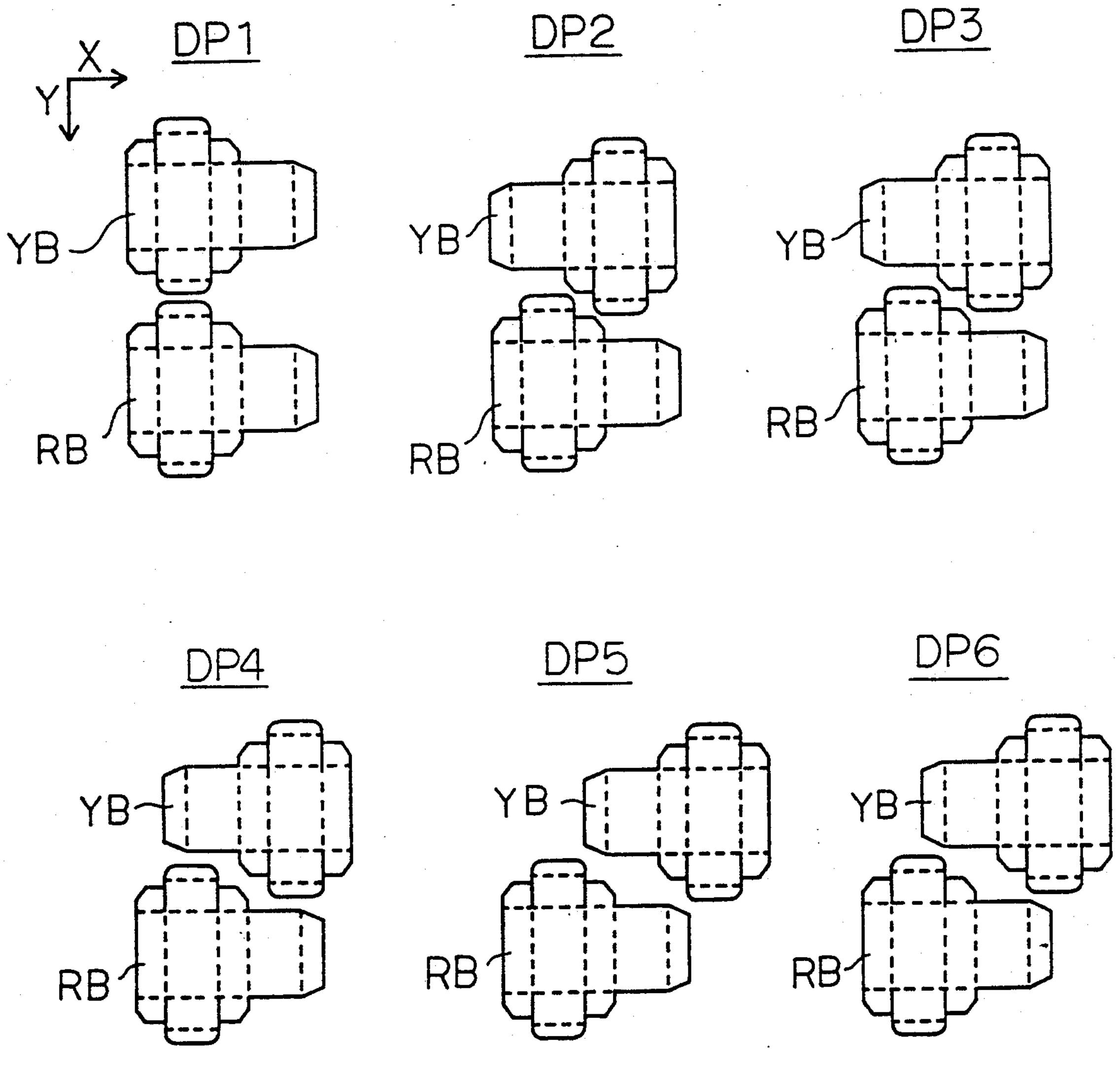
FIG. 7 schematically illustrates a pattern for photocomposing.

At a step S8, the composing data generating means 14 produces composing data on the basis of the development pattern data Dp1 (FIG. 5C). The ROM 20 memorizes plural kinds of composing patterns, and one of them is selected by an operator. FIG. 7 schematically illustrates composing patterns DP1--DP6 memorized in the ROM 20. Each of the composing patterns represents a positional relation between a reference box RB and a Y-adjoining box adjoining the reference box in Y direction as follows:

DP1 (regular arrangement): the orientation of the reference box RB is equal to that of the Y-adjoining box, and the left end side of the outline of the reference box RB is aligned with that of the Y-adjoining box YB.

DP2: the orientation of the reference box RB is opposite to that of the Y-adjoining box (this is also the case with the other patterns DP3–DP6), and the left end side of the outline of the reference box RB is aligned with that of the Y-adjoining box YB.

DP3: the left end piece of the vertical folding lines of the reference box RB is aligned with that of the Y-adjoining box YB. In FIG. 7, the folding lines are drawn with broken lines.

DP4: the left end piece of the vertical folding lines of the reference box RB is aligned with the left end side of the outline of the Y-adjoining box YB.

DP5: the second piece of the vertical folding lines from the left end of the reference box RB is aligned with the left end side of the outline of the Y-adjoining box YB.

DP6: the left end piece of the vertical folding lines of the reference box RB is aligned with the left end piece of the folding lines of the Y-adjoining box YB.

One of the composing patterns is selected by an operator, and developments of paper-ware are arranged according to the selected composing pattern. In this embodiment, the third composing pattern DP3 is selected.

Figure 8A:
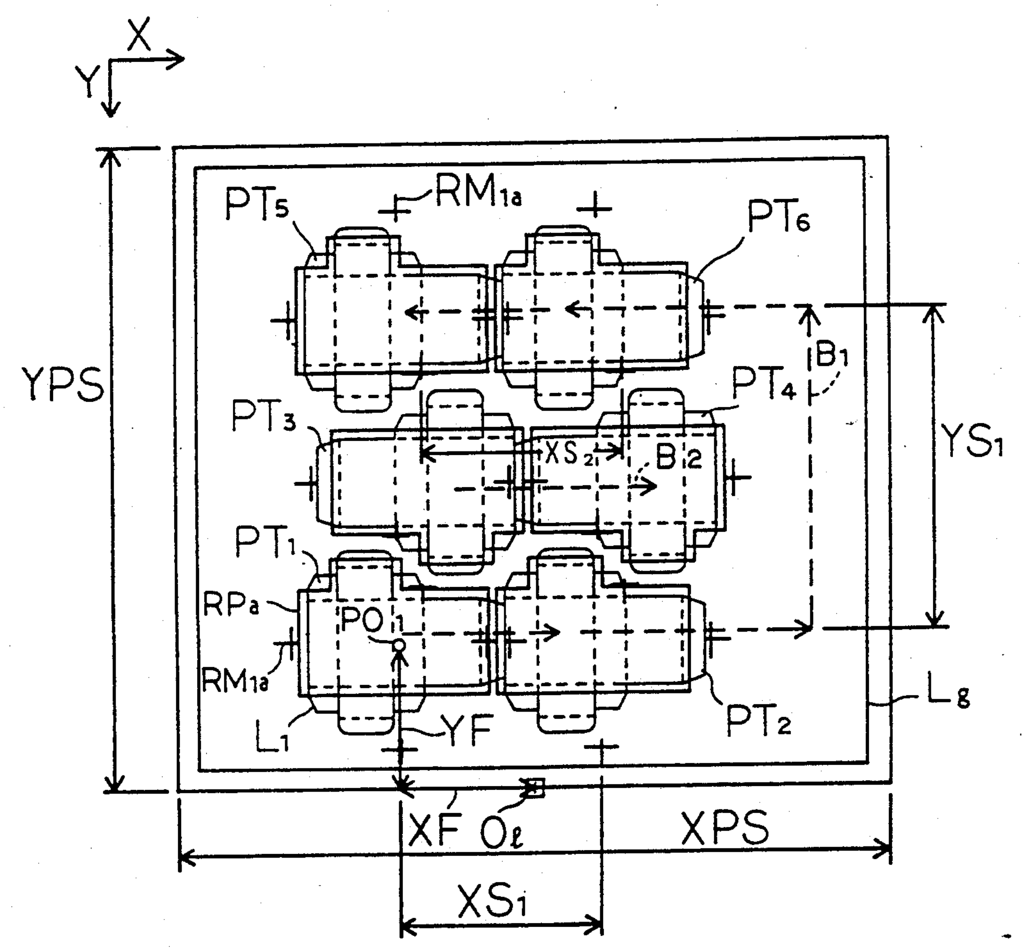
FIGS. 8A and 8B schematically illustrate a photocomposing arrangement.

FIG. 8A is a plan view of a development arrangement to be used in photocomposing operation. In this figure, six development patterns PT1-PT6 are arrayed. Four development patterns PT1, PT2, PT5, and PT6 are oriented in the same manner while the other two development patterns PT3 and PT4 are oriented upside down. The photocomposer first prints images in respective printing areas RPa of the development patterns PT1, PT2, PT6, and PT5 in this order according to an arrow B1 shown in FIG. 8A. The original film is then rotated at an angle of 180 degrees, and images of the other development patterns PT3 and PT4 are printed in the order of an arrow B2. The set of the development patterns PT1, PT2, PT6, and PT5 are hereinafter referred to as "block Bl", and the set of the development pattern PT3 and PT4 as "block B2".

Figure 8B:
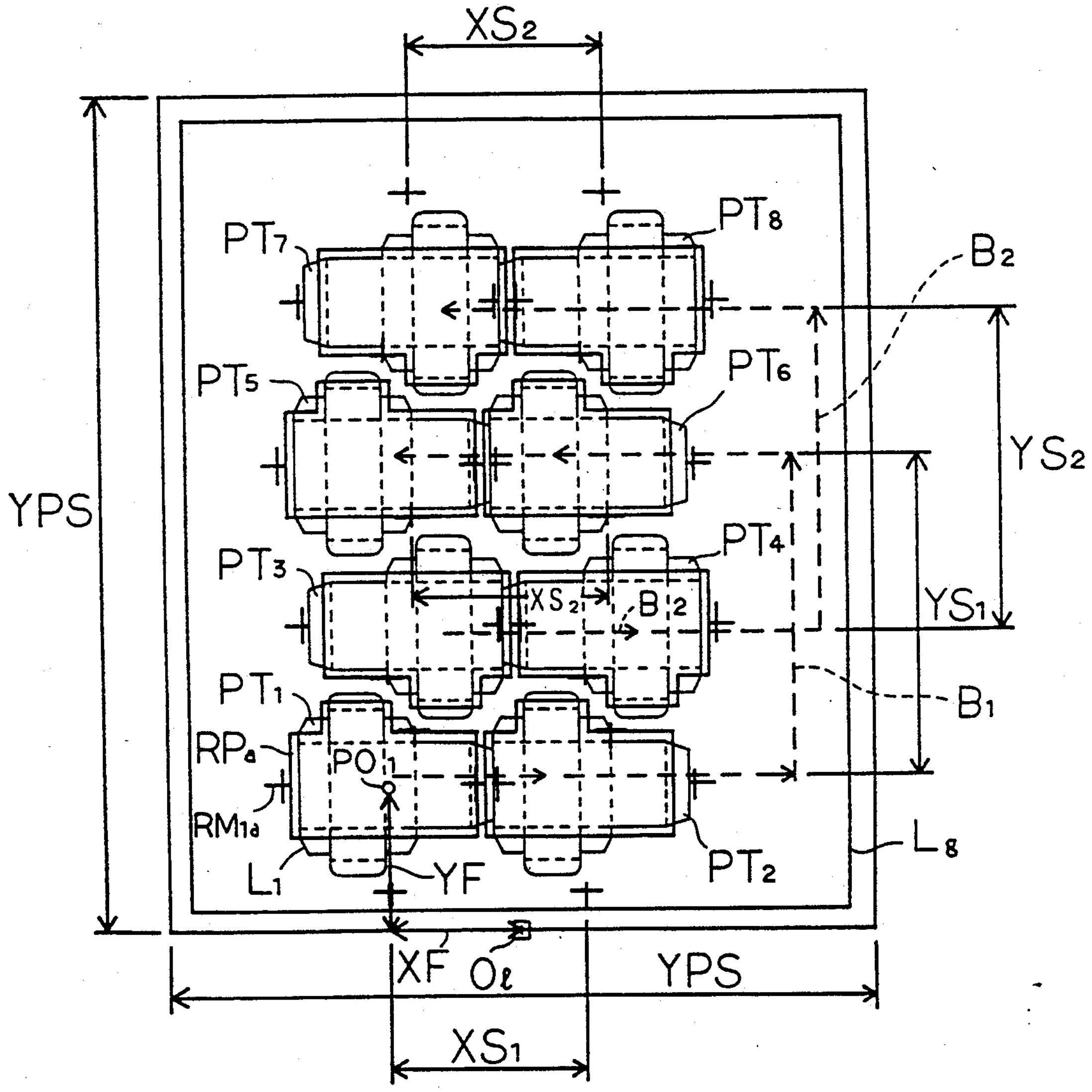

FIG. 8B is a plan view showing another arrangement including eight development patterns PT1–PT8. In this arrangement, the second block B2 includes four development patterns PT3, PT4, PT7, and PT8. The description of the embodiment below, however, will be made mainly for the case shown in FIG. 8A.

In the printing process, images are printed on respective expanded printing areas RPa on a printing paper. The printed paper is then cut along the outlines L1 of each paper-ware. Summation of the printing area RPa and an area surrounded by the outline L1 is a minimum area for each paper-ware. The development patterns PT1–PT6 are arranged in the complementary state shown in FIG. 8A so as to make the area other than the required areas on a photosensitive material as small as possible. This arrangement allows many development patterns to be arrayed in a printing plate of a prescribed size.

The composing data generating unit 14 adjusts distances between the development patterns PT1–PT6 while preventing the development patterns from overlapping with each other, thereby producing composing data representing an optimum composing arrangement which includes the largest number of development patterns arrayed on a printing plate of a prescribed size. The composing data are inputted to the photocomposer before a photocomposing operation.

Figure 9:
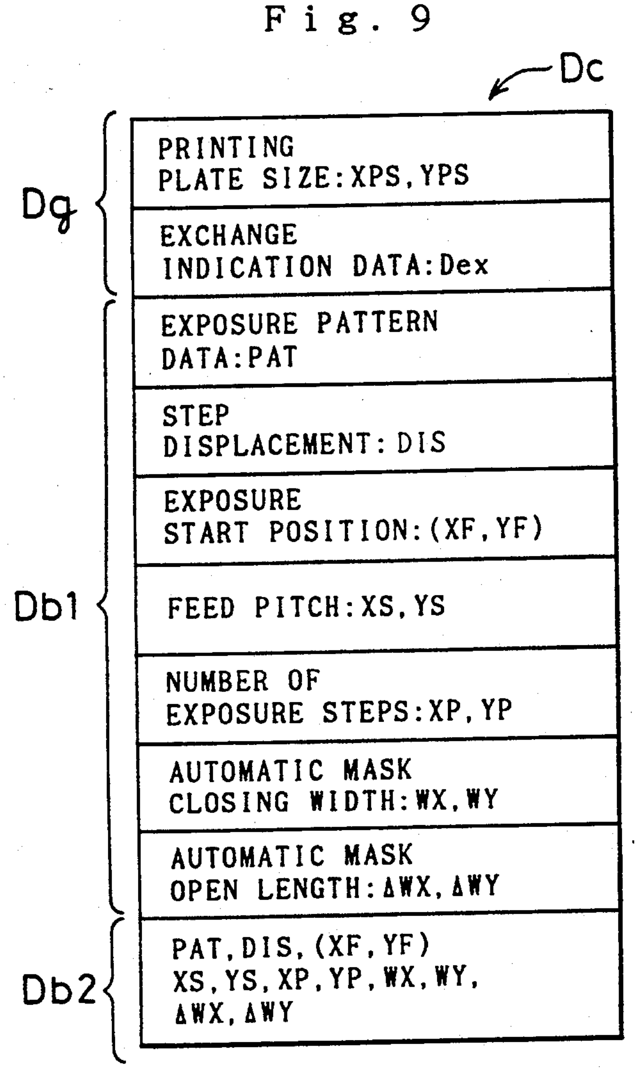
FIG. 9 schematically illustrates photocomposing data.

FIG. 9 schematically illustrates the structure of the composing data. The composing data Dc comprises group data Dg and block data Db1 and Db2.

The group data Dg represents information about the whole photosensitive material, such as printing plate sizes XPS and YPS, and exchange indication data Dex. The printing plate sizes XPS and YPS are dimensions of a printing plate (that is, the photosensitive material) in X direction and Y direction, respectively. Incidentally, a frame Lg inside the sides of the printing plate corresponds to inner sides of gripper margins or cutoff margins. The exchange indication data Dex indicates whether to change original films and/or masks and whether to rotate an original film. For the case shown in FIG. 8A, the exchange indication data Dex indicates to rotate the original film at an angle of 180 degrees between the exposure operation for the block B1 and that for the block B2.

Figure 10:
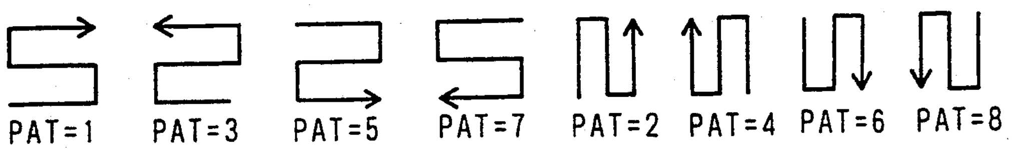
FIG. 10 schematically illustrates an order of exposure in photocomposing operation.

The block data Db1 and Db2 are used in exposing the images of the blocks B1 and B2, respectively. Each block data includes the following data:

Exposure pattern data PAT: representing the order of exposing the printing areas in a single block. FIG. 10 shows eight types of orders of exposure. The blocks B1 and B2 are exposed according to the order designated by PAT=1.

Step Displacement DIS: representing displacement in the case where odd-numbered rows and even-numbered rows are displaced in the X direction in a single block (in the Y direction when PAT 2, 4, 6, or 8). The value of the step displacement DIS is one in the case shown in FIG. 8A.

Exposure start position (XF, YF): representing coordinates of exposing center PO1 of the pattern PT1 which is first exposed while a layout reference point 01 is defined as an origin of the coordinates. The pattern PT3 is the first pattern to be exposed in the block B2, and the exposure start positions are therefore calculated for the exposing center of the pattern PT3.

Feed pitch XS, YS: represents feed pitches in the X and Y directions, respectively, in moving an original film held in the original holder to a adjoining position in a single block. In the case of FIG. 8A, XS=XS1 and YS=YS1 for the block B1, and XS=X2 for the block B2. In the case of FIG. 8B, XS=XS1 and YS=YS1 for the block B1, and XS=XS2 and YS=YS2 for the block B2.

Number of exposure steps XP, YP: represents the numbers of exposure in X and Y directions, respectively. In the case of FIG. 8A, XP=2 and YP=2 for the block B1, and XP=2 and YP=1 for the block B2. In the case of FIG. 8B, XP=2 and YP=2 for both blocks B1 and B2.

Automatic mask closing width WX, WY and automatic mask open length ΔWX, ΔWY: represents dimensions of the aperture of the automatic masking device of the photocomposer. The automatic masking device has four mask plates at the four sides of the aperture, two of the mask plates are movable in the longitudinal direction and the other two in the lateral direction, respectively. An aperture of a rectangular shape is made with the inner edges of the four mask plates, and the size of the aperture can be changed by moving the mask plates. Details of the automatic masking device is described, for example, in Japanese Patent Laying Open Gazette 64-29847.

Figure 11:
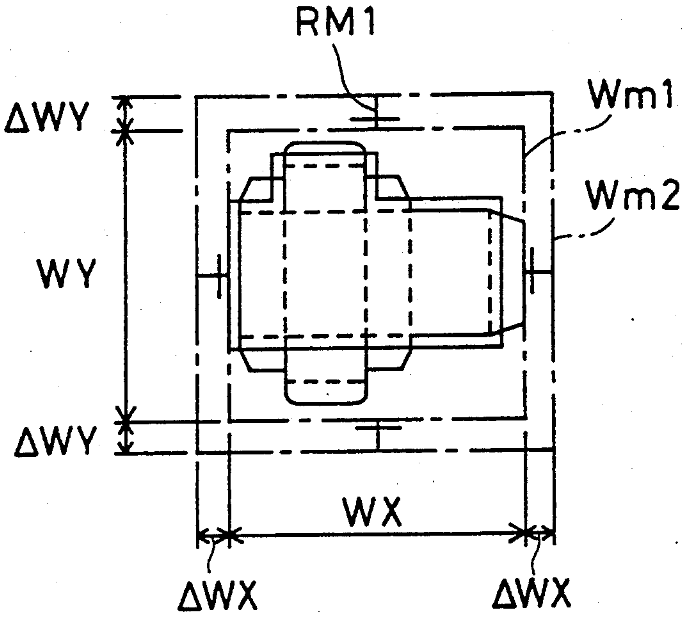
FIG. 11 schematically illustrates opening and shutting states of an automatic masking device.

FIG. 11 schematically illustrates the automatic mask closing widths WX and WY, and the automatic mask open lengths ΔWX and ΔWY. When all of the mask plates of the automatic mask are closed, an aperture Wm1 of a rectangular shape is formed which circumscribes an area within the four center register marks RM1. On the other hand, when the all of the mask plates are open, an aperture Wm2 is formed which circumscribes an area outside of the four center register marks RM1. The automatic mask closing width WX and WY are dimensions in X and Y directions, respectively, of the aperture Wm1. The automatic mask open lengths ΔWX and ΔWY are lengths in X and Y directions, respectively, by which the mask plates move to open or close.

The composing data Dc including the above data are stored in floppy discs by means of the floppy drive device 112. The composing data Dc in the floppy discs are read out by the photocomposer, and are used in the photocomposing operation described later.

Figure 12:
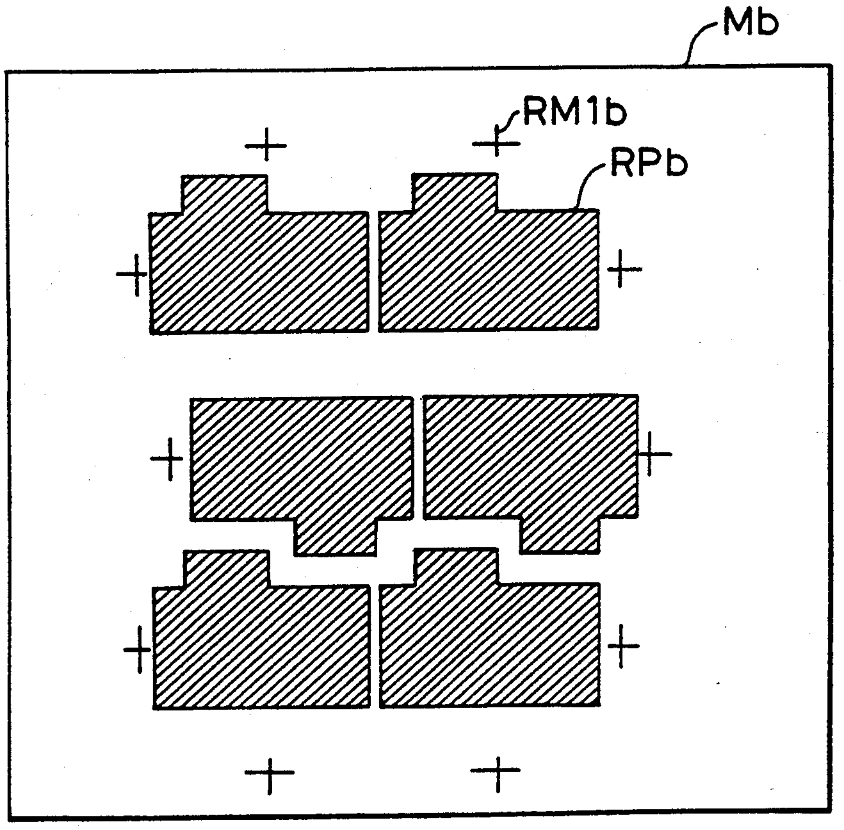
FIG. 12 is a plan view of an exposing-out mask.

At a step S9, the composing data Dc and the photocomposing mask data De2 (FIG. 4D) are transmitted to the exposing-out mask data generating unit 15, and exposing-out mask data are produced therein. The exposing-out mask data are transmitted to the sample-cutting and drawing machine 200, and an exposing-out mask is fabricated therein from the exposing-out mask data. FIG. 12 is a plan view of the exposing mask Mb thus fabricated. Incidentally, the exposing-out mask data is vector data representing the exposing-out mask Mb.

The exposing-out mask Mb is used for masking the printing areas RPa and the center register marks RM1b on the photosensitive material. A non-printing area of the photosensitive material, except the printing areas RPa and the center register marks RM1b, is to be exposed after the photocomposing operation, whereby printing ink is not put on the non-printing area. As shown in FIG. 12, The exposing out mask Mb has masking parts corresponding to the expanded printing areas RPb and the center register marks RM1b shown in FIG. 4D according to the composing pattern shown in FIG. 8A. In other words, parts of the red thin layer of a peel film corresponding to the printing areas RPb are kept as image masking parts, and parts of the red thin layers corresponding the center register marks are kept as register mark masking parts, while the other part of the red thin layer is peeled off. Incidentally, the exposing-out mask Mb does not mask particular center register marks which are placed between the printing areas RPb since these register marks are masked by the automatic masking device and are accordingly not printed by the photocomposer.

As described above, the paper-ware design work station 100 and the sample-cutting and drawing machine 200 cooperate to produce the photocomposing mask Mc, the exposing-out mask Mb, and the composing data Dc. Incidentally, the photocomposing mask can be fabricated in the final step S9 along with the exposing-out mask.

Figure 13:
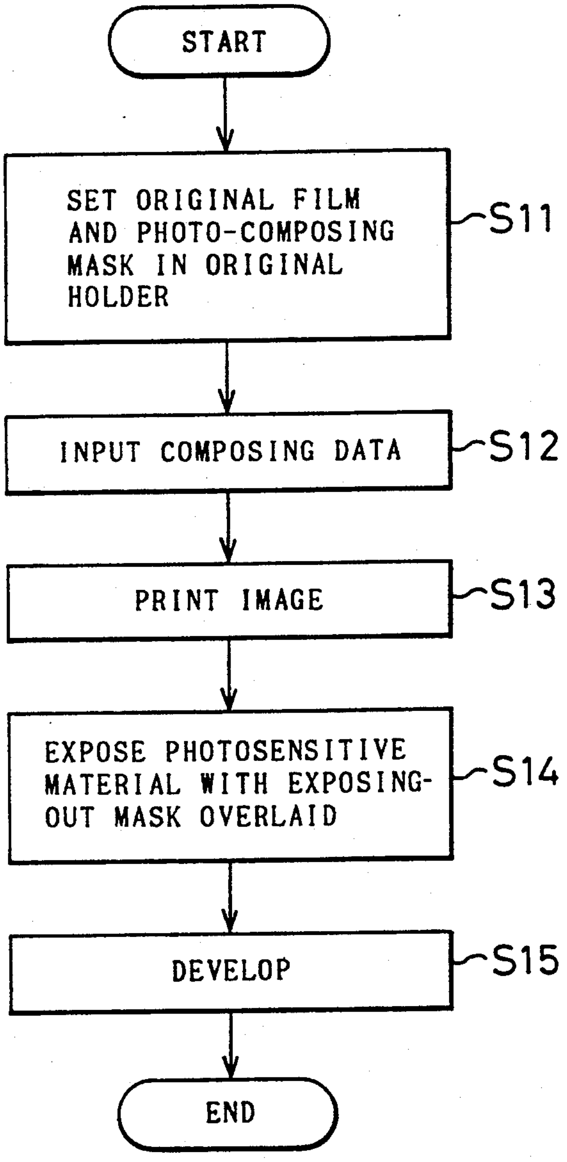
FIG. 13 is a flow chart of the process for fabricating a printing plate.

FIG. 13 is a flow chart of the procedure of fabricating a printing plate with the photocomposing mask Mc and the exposing-out mask Mb.

Figure 14:
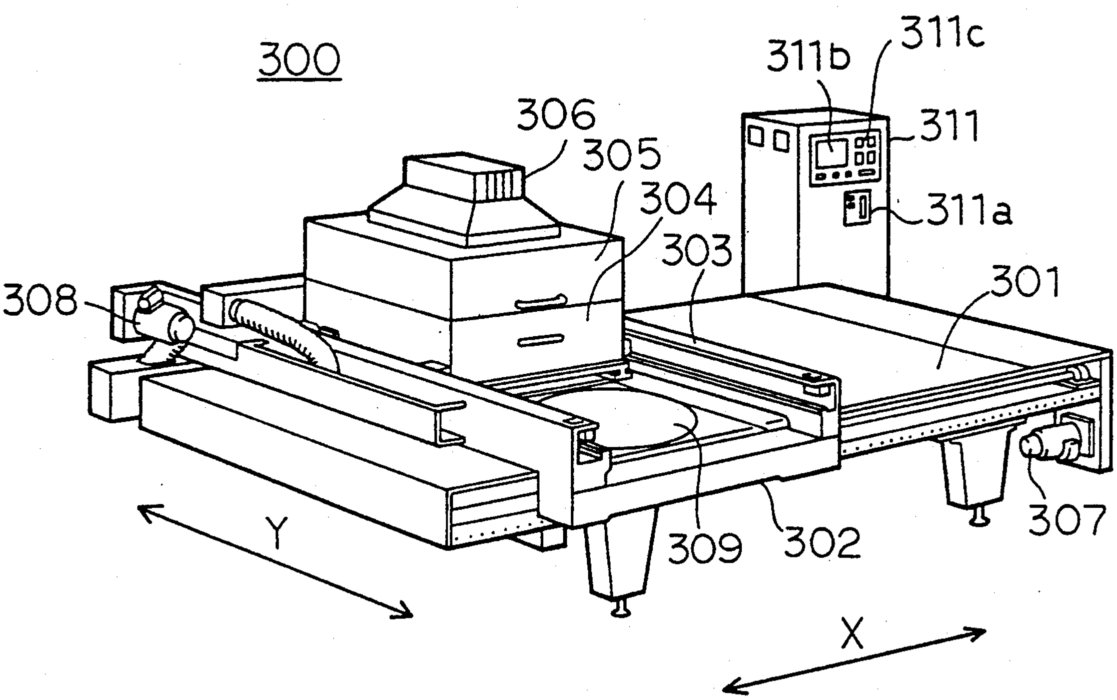
FIG. 14 is a perspective view of a photocomposer.

At a step S11, an original film with the photocomposing mask overlaid is set in an original holder of the photocomposer. FIG. 14 is a perspective view of the photocomposer. The photocomposer 300 comprises a mounting table 301 on which a photosensitive material is mounted, and a moving frame 302 movable in an X direction over the mounting table 301. The moving frame 302 has guide rails 303 running in a Y direction, to which an original holding rack 304 including the original holder is connected to be movable in the Y direction. On the original holding rack 304, a light source box 305 with a light source 306 thereon is fixed. The photocomposer further comprises a controller 311. The photocomposer 300 is operated automatically with the controller 311. In the exposing operation, the moving frame 302 is driven by an X-axis drive motor 307 to move in the X direction, and the original holding rack 304 is driven by a Y-axis drive motor 308 to move in the Y direction. Next to the mounting table 301 is provided an original-serving turntable unit 309.

Figure 15:
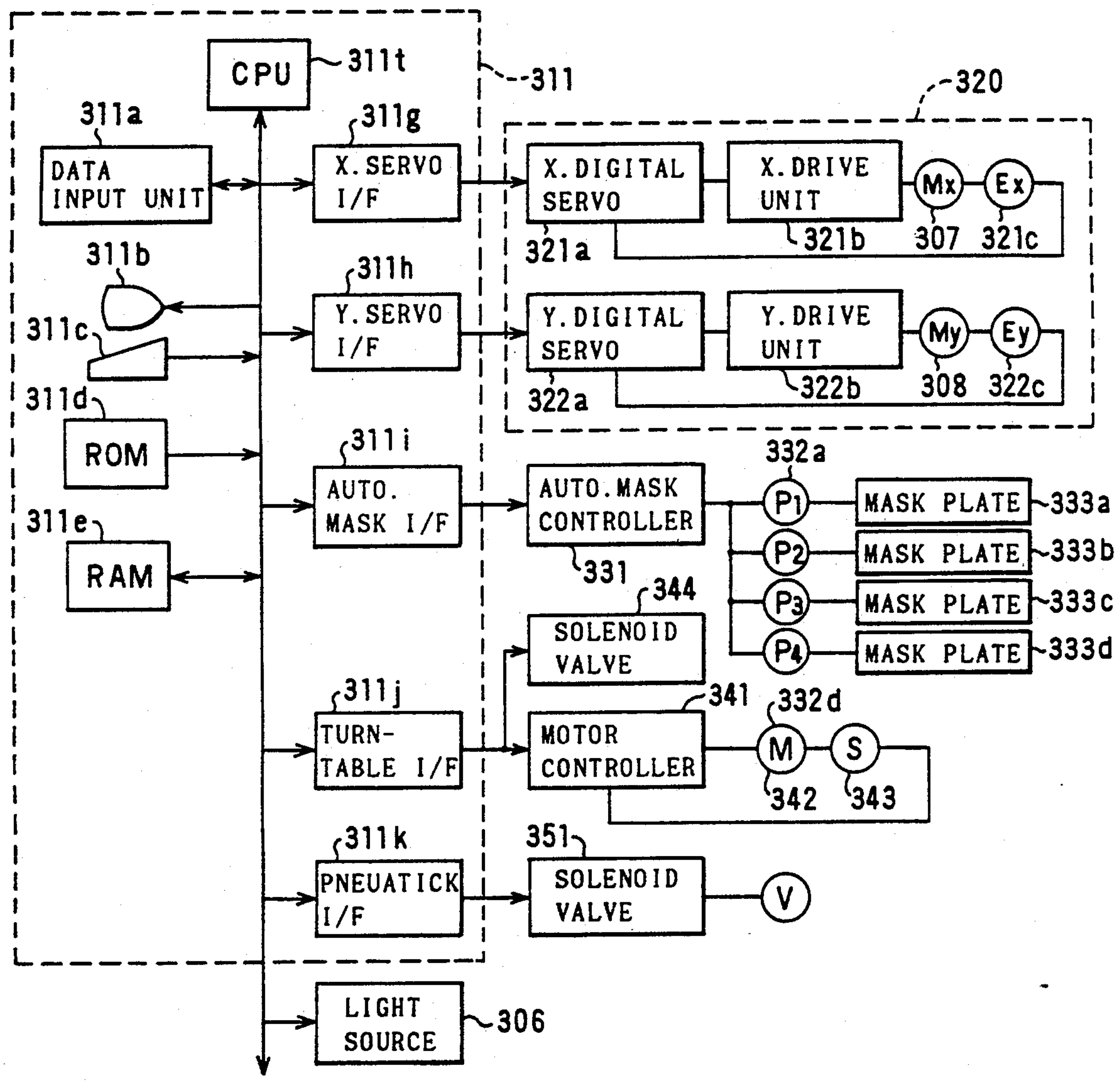
FIG. 15 is a block diagram showing electrical structure of the photocomposer.

FIG. 15 is a block diagram showing the electrical structure of the photocomposer. The controller 311 comprises a photocomposing data input unit 311*a* (floppy disc drive), a CRT 311*b*, a keyboard 311*c*, a ROM 311*d*, a RAM 311*e*, and a CPU 311*f*, to which the above elements are connected, and various kinds of interface units 311*g*, 311*h*, 311*i*, 311*j*, and 311*k* for transmitting control data to various drive units of the photocomposer.

he X-axis servo interface 311*g* and the Y-axis servo interface 311*h* are connected to an X-axis servo system and a Y-axis servo system, respectively, which are provided in an original-holding-rack drive unit 320. The X-axis servo system comprises an X-axis digital servo unit 321*a*, an X-axis drive unit 321*b*, the X-axis drive motor 307 (FIG. 14), and an X-axis encoder 321*c*. The Y-axis servo system similarly comprises a Y-axis digital servo unit 322*a*, a Y-axis drive unit 322*b*, the Y-axis drive motor 308 (FIG. 14), and a Y-axis encoder 322*c*.

The automatic-mask drive interface 311*i* is connected to an automatic-mask drive unit for driving the automatic masking device 330 provided in the original holding rack 304. The automatic-mask drive unit comprises an automatic-mask controller 331, four pulse motors 332*a*–332*d*, and four mask plates 333*a*–333*d* which is driven by the pulse motors 322*a*–332*d*, respectively.

Figure 16:
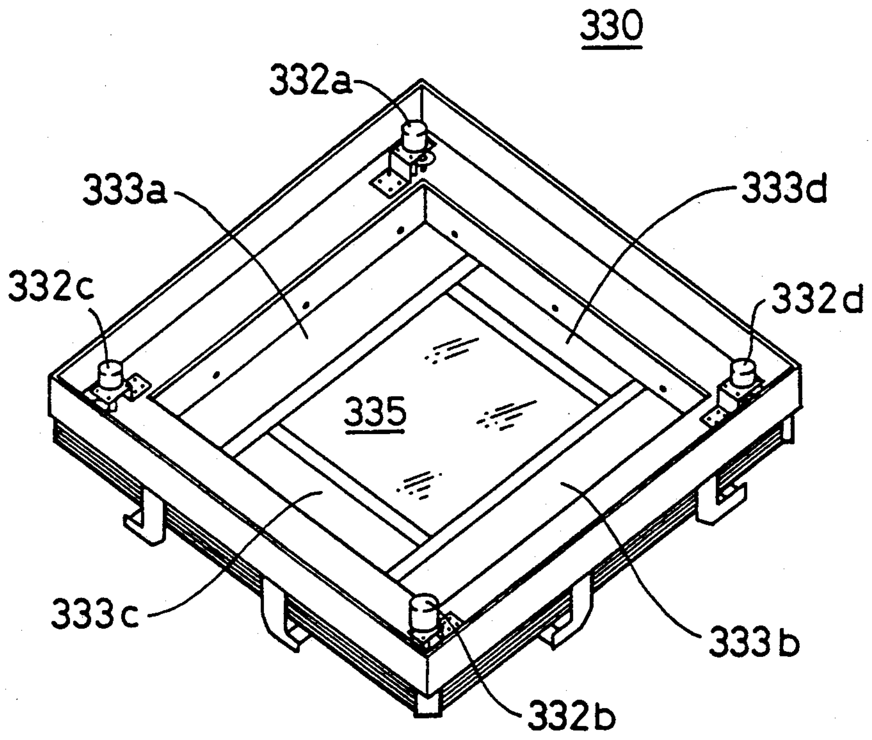
FIG. 16 is a perspective view of an automatic masking device.

FIG. 16 is a perspective view showing an automatic masking device 330. Two mask plates 333*a* and 333*b* are movable in a longitudinal direction, and the other two mask plates 333*c* and 333*d* are movable in a lateral direction. The two mask plates 333*a* and 333*b* are set above the other two mask plates 333*c* and 333*d* so as not to interfere with them. The mask plates 333*a*–333*d* for shielding light are arranged so as to surround an original film in a rectangular shape. The automatic masking device 330 also comprises a glass plate 335 under the mask plates 333*a*–333*d*. An original plate is fixed under the glass plate 335 by an original holder described later.

The turntable dirve interface 311*j* is connected to a turntable drive unit for rotating the turntable provided in the original-serving turntable unit 309 (FIG. 14). The turntable drive unit includes a motor controller 341, a motor 342, an angle sensor 343, and a solenoid valve 344. The function of these elements will be described later.

The pneumatic system interface 311*k* is connected to solenoid valves 351 in the pneumatic system. The pneumatic system includes a system for applying suction to an original film on the turntable of the original-serving turntable unit 309, and air cylinders for supporting the mounting table 301.

The CPU 311*f* is also connected to the light source 306 to on-off control the same.

At a step S11, an operator puts an original film and the photocomposing mask Mc overlaid thereon on the original-serving turntable unit 309. The original holding rack 304 then moves to the place right over the original-serving turntable 309, and the original holder provided in the original holding rack 304 applies suction to hold the original film and the photocomposing mask Mc. The original film and the photocomposing mask Mc are thus set in the original holder.

Figure 17:
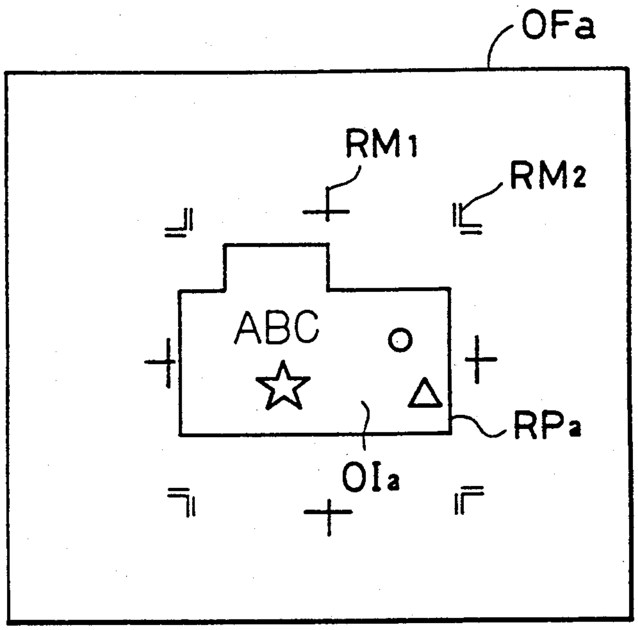
FIG. 17 is a plan view of an original plate.

FIG. 17 is a plan view of the original film OFa. On the original film OFa, an original image OIa (such as letters or figures) and register marks RM1 and RM2 are recorded.

Figure 18A:
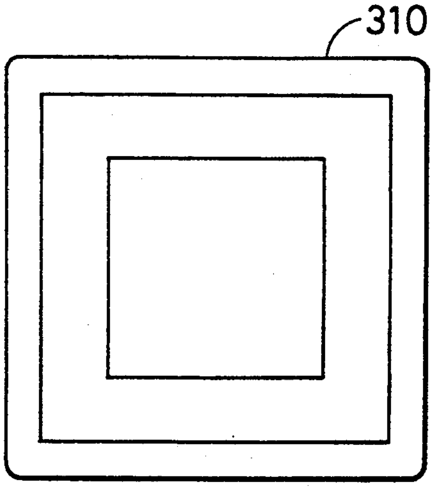
FIGS. 18A and 18B are a plan view and a longitudinal sectional view of an original film holder, respectively.
Figure 18B:
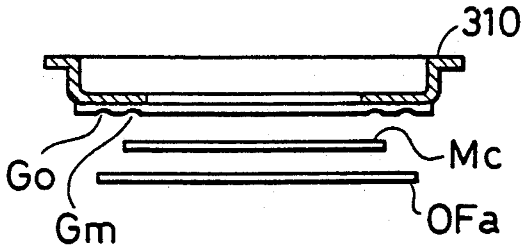

FIGS. 18A and 18B are a plan view and a longitudinal sectional view of the original holder, respectively, in which the original film OFa and the photocomposing mask Mc are set. The original holder 310 has double grooves at its lower surface including an original suction groove channel Go and a mask suction groove channel Gm inside the original suction groove channel Go. The suction grooves Go and Gm as a whole apply suction to hold the original film OFa and the photocomposing mask Mc simultaneously.

At a step S12, The composing data Dc shown in FIG. 9 are inputted into the controller 311 of the photocomposer 300. This input operation is performed by inserting a floppy disc storing the composing data Dc into the floppy disc drive 311*a* of the controller 311, and by reading out the composing data. The composing data Dc is memorized by the RAM 311*e* in the controller 311.

Figure 19:
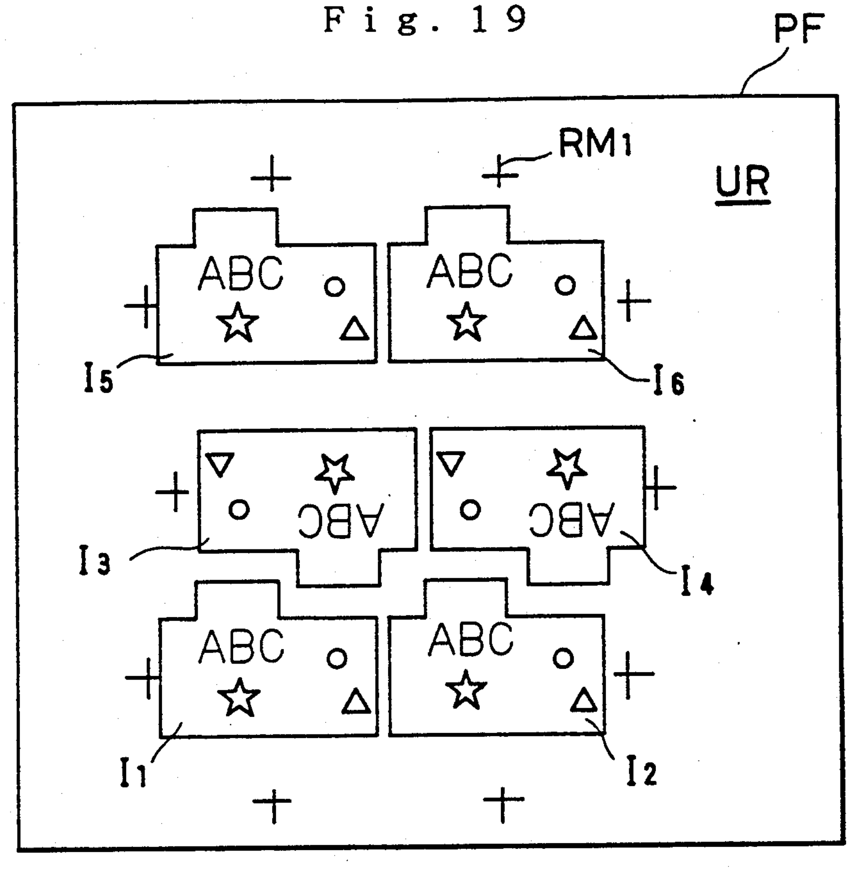
FIG. 19 is a plan view of a photocomposed photosensitive material.

At a step S13, plural images of the original film OFa are printed on a photosensitive material according to the composing data Dc. FIG. 19 is a plan view of the photosensitive material PF on which plural images are printed. Six imaged I1–I6 in this figure are images for the six development patterns PT1–PT6 shown in FIG. 8A. Among the six images I1–I6, the images I1, I2, I6, and I5 for the development patterns PT1, PT2, PT6, and PT5 of the block B1 (FIG. 8A) are printed by exposure in this order. The original film OFa and the photocomposing mask Mc are then rotated together at an angle of 180 degrees, and subsequently the images I3 and I4 for the development patterns PT3 and PT4 of the block B2 are printed in this order.

Figure 20A:
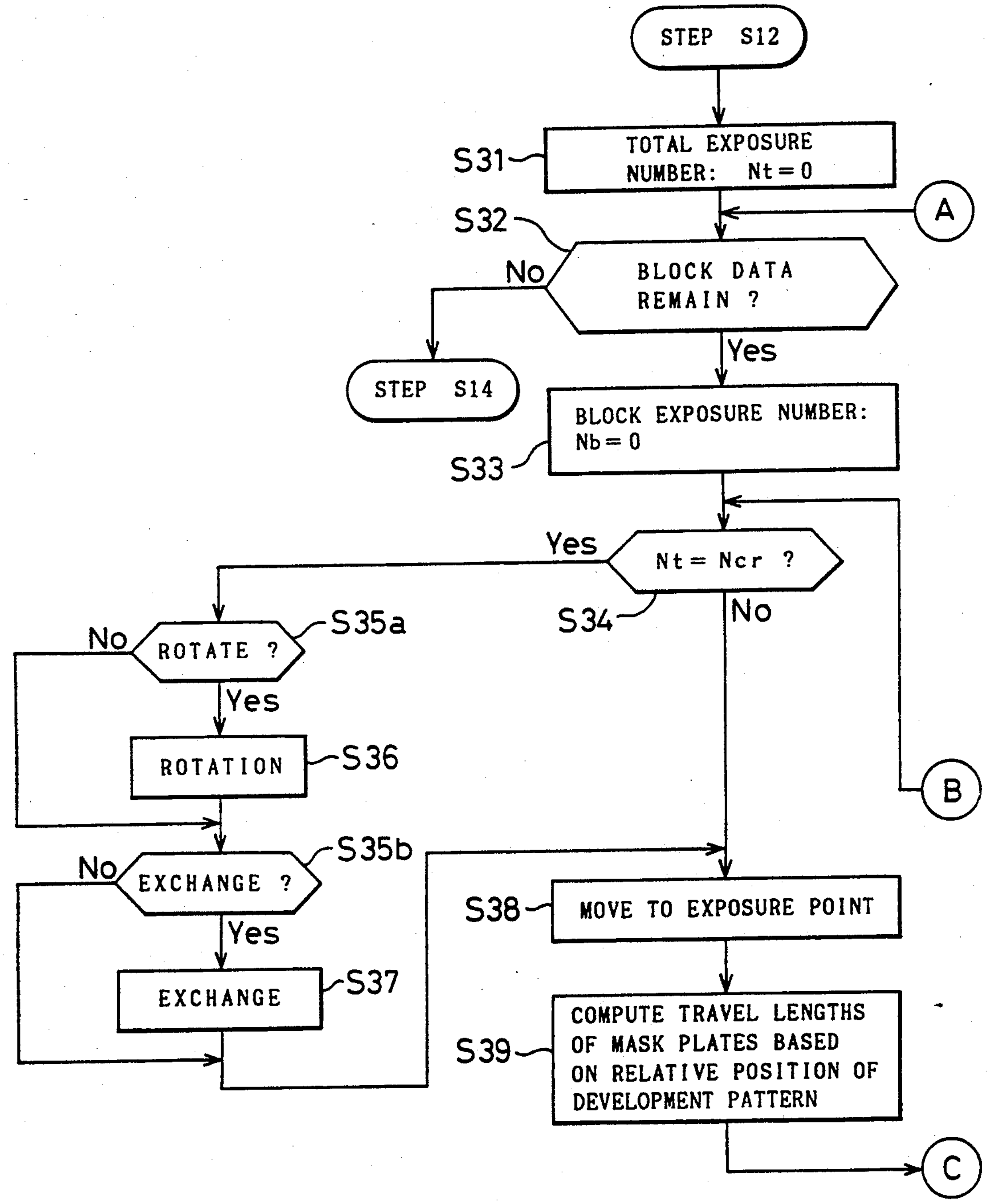
FIGS. 20A and 20B are flow charts of the procedure of photocomposing operation.
Figure 20B:
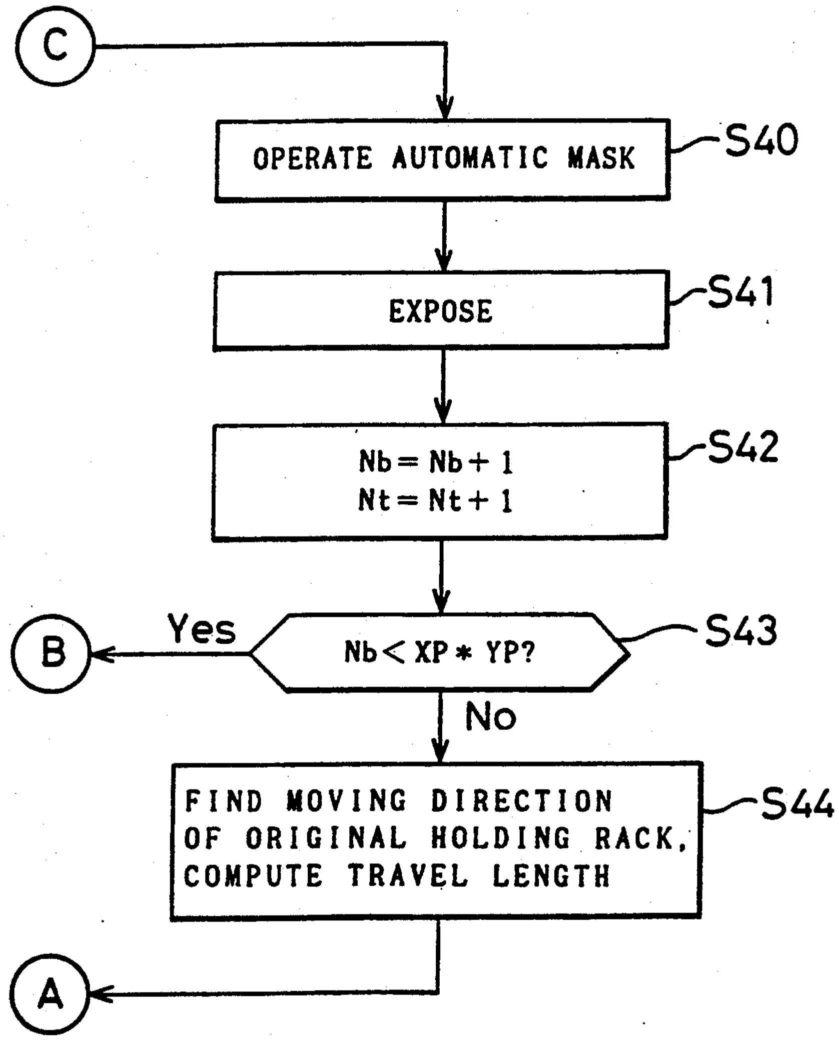

FIGS. 20A and 20B are flow charts showing detailed procedures of the photocomposing operation by the photocomposer 300.

At a step S31, a parameter Nt representing the total number of images-to-be-printed (hereinafter referred to as "total image number") is set to zero.

At a step S32, judgment is made whether any block data (the data Db1 or Db2 shown in FIG. 9) remain to be read out. If some block data remain, the next step S33 is carried out.

At the step S33, a parameter Nb representing the number of images-to-be-printed in a single block is set to be zero.

At the next step S34, judgment is made whether the total exposure number Nt is equal to a rotation-exchange indication number Ncr represented by the exchange indication data Dex (FIG. 9). The rotation-exchange indication number Ncr indicates the number of images to be printed before rotation or exchange of the original film is performed. In FIG. 8A, the block B1 includes four development patterns, and the rotation-exchange indication number Ncr is set to be four accordingly. Since Nt=0 in printing the image I1 of the first development pattern PT1, the procedure is skipped to a step S38 from the step S34. (Steps S35a through S37 will be described later.)

At the step S38, the original holding rack 304 is moved to a position where exposing operation is to be performed according to the exposure start position (XF, YF). In this step, the CPU 311*f* first transmits the exposure start position XF to the X-axis servo system through the interface 311*g*, and the exposure start position YF to the Y-axis servo system through the interface 311*h*, whereby the motors 307 and 308 are operated accordingly.

At a step S39, the CPU 311*f* checks the relative position of the current development pattern (PT1 in this stage) on the basis of the exposure pattern data PAT and the numbers of exposure XP and YP, all of which are included in the block data Db1, and the block exposure number Nb. The relative position denotes whether another development pattern is positioned at any side of the current development pattern.

Figure 21:
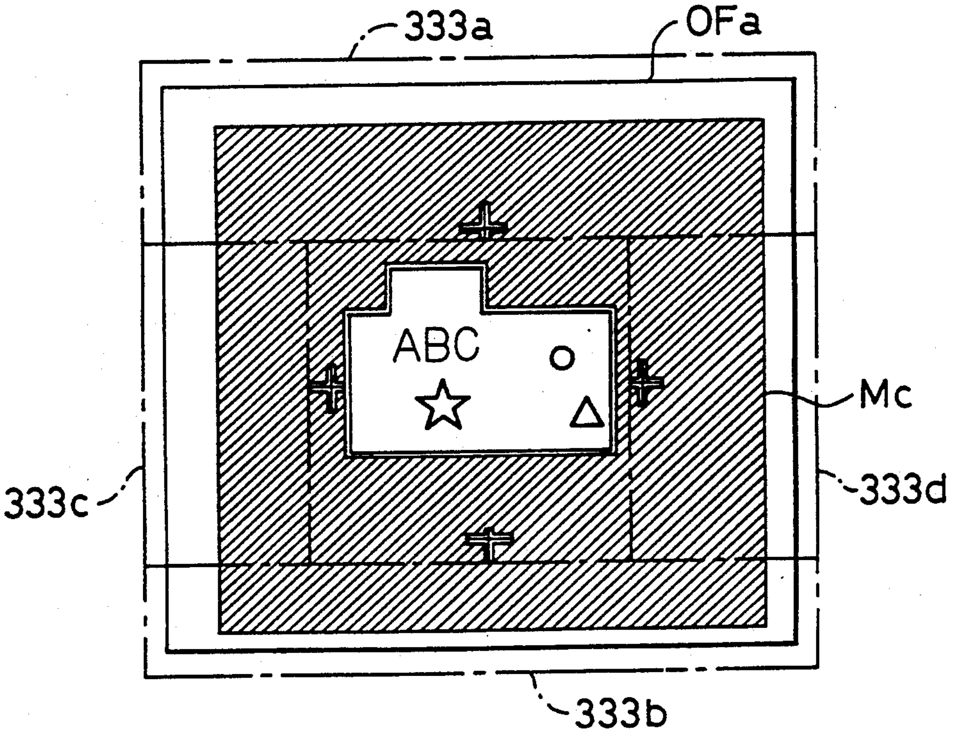
FIG. 21 is a schematic plan view showing positions of mask plates in photocomposing operation.

Simultaneously at the step S39, travel lengths of respective mask plates 333_a_–333_d_ of the automatic mask are computed on the basis of the checked relative position, the automatic mask closing width WX and WY, and the automatic mask open length ΔWX and ΔWY. In FIG. 8A, for example, the development pattern PT1 has no other development patterns adjoining at its left-hand side and its lower side, and therefore, as shown in FIG. 21, the mask plates 333_c_ and 333_b_ of the left-hand side and the lower side respectively are opened while the mask plates 333_d_ and 333_a_ of the righthand side and the upper side respectively are closed. The mask plates 333_a_–333_d_ are drawn with dash-and-dotted lines in FIG. 21.

The above processing is performed by the CPU 311f according to a software program memorized in the ROM 311d while using the data PAT, XP, YP, WX, WY, ΔWX, and ΔWY.

At a step S40, the travel lengths of the mask plates of the automatic mask are given from the CPU 311f to the automatic masking device through the automatic mask drive interface 311_i_, and the four mask plates are moved as described before.

At a step S4l, the light source 306 is turned on to expose the photosensitive material. In this process, particular register marks where the mask plate is open are printed, while other register marks where the mask plate is closed are not printed. Consequently, the center register marks at the left-hand side and the lower side of the image I1 are printed in printing the image I1.

Incidentally, the original film and the photosensitive material are contacted with each other in the exposing operation, and they are separated after the exposing operation. The contacting and separating operations in the original holder are performed by switching the solenoid valve 351 to apply vacuum induced by a vacuum pump to the original film and the photocomposing mask.

At a step S42, the total image number Nt and the block exposure number Nb are increased by one.

At a step S43, the block exposure number Nb is compared with a product of the numbers of exposure XP and YP, that is, (XP*YP). When the block exposure number Nb is less than the product (XP*YP), the exposure operation for the block is not finished, and therefore the process loops back to B and picks up at step 534 to continue the exposure operation. On the other hand, when the block exposure number Nb is equal to than the product (XP*YP), the exposure operation for this block is already finished, and therefore the next step S44 is performed.

At a step S44, a direction in which the original holding rack 304 is moved is found on the basis of the block image number Nb, the exposure pattern data PAT, and the numbers of exposure steps XP and YP. The travel length of the original holding rack 304 is also computed on the basis of the feed pitches XS and YS, and the displacement DIS. These computations are performed by the CPU 311_f_ according to a software program memorized in the ROM 311_d_ in advance. After step S44, the process is looped back (as indicted by the A reference) to step S32 of the process.

By repeating the steps S34 through S44, the images I1, I2, I6, and I5 of the development patterns PT1, PT2, PT6, and PT5 of the block B1 are printed. When all of the images of the block B1 are printed, the process is transferred from the step S43 to the step S44 to step S32, whereby the exposing operation for the block B2 is performed. At the step S34, in this case, the processing after the step S35_a_ described below is performed because the total exposure number Nt is equal to four and equal to the rotation-exchange indication number Ncr.

At steps S35_a_ and S35_b_, judgment is made which as to operation of the exchange or rotation of the original film is performed. The judgment is based on the exchange indication data Dex.

In the case of FIG. 8A, since the development pattern PT3 and PT4 of the block B2 have an orientation 180 degrees rotated from that of the development patterns of the block B1, the original holder is rotated at an angle of 180 degrees at a step S36. In this operation, the X-axis drive motor 307 and the Y-axis drive motor 308 are operated to move the original holding rack 304 to the point above the original-serving turntable unit 309.

The solenoid valve 351 of the suction pneumatic system is then operated for applying air pressure to the original holder 310 provided in the original holding rack 304, whereby the original film OFa and the photocomposing mask Mc are separated from the original holder 310.

Subsequently, the original-serving turntable unit 309 with the original film OFa and the photocomposing mask Mc mounted is rotated at an angle of 180 degrees. The solenoid valve 343 is then operated to latch the original-serving turntable unit 309 to fix the orientation of the same. The original-serving turntable unit 309 can be fixed at the orientations of any one of 0 degrees, 90 degrees, 180 degrees, and 270 degrees. Finally in the rotation operation, the original film OFa and the photocomposing mask Mc are attached by suction to the original holder 310.

When it is judged to change the original film OFa or the photocomposing mask Mc at the step S35b, a step S37 is performed. At this step, the original holding rack 304 moves to the point above the original-serving turntable unit 309. The original film and the photocomposing mask are separated from the original holder 310, and then an operator changes the original films and the photocomposing masks. In the cases of FIGS. 8A and 8B, however, the step S37 is not carried out.

After that, the procedure after the step S38 is performed in the same manner as above, whereby the images I3 and I4 of the block B2 are printed.

The photosensitive material thus exposed has the duplicated images I1–I6 and the duplicated center register marks RM1 around respective images I1–I6. However, the center register marks located between the images I1–I6 are not printed because the corresponding automatic mask is closed as described before.

The non-printing area UR on the photosensitive material, except the images I1–I6 and the center register marks RM1, is an area to be exposed to repel printing ink. At the step S13 of FIG. 13 (steps S31–S44 of FIGS. 20A and 20B), however, the non-printing area UR is not exposed yet.

Figure 22:
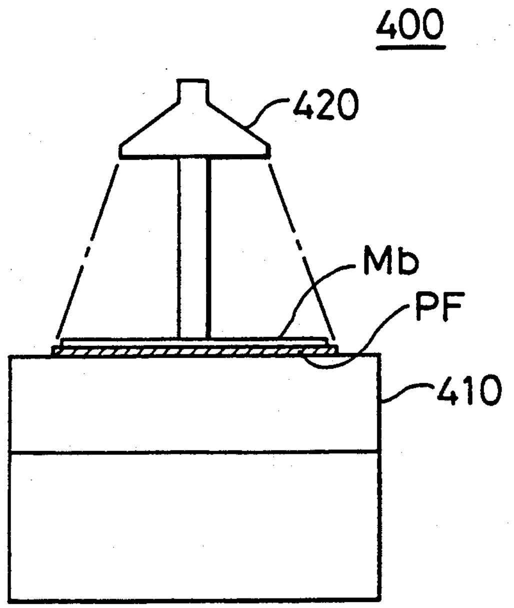
FIG. 22 is a front view of a contact exposing machine.

At a step S14, the exposing-out mask Mb shown in FIG. 12 is overlaid on the photosensitive material PF shown in FIG. 19, and the non-printing area UR on the photosensitive material PF is exposed all over. This exposure operation is performed with a so-called contact exposing machine, for example. FIG. 22 is a front view of a contact exposing machine 400. The contact exposing machine 400 comprises a table 410 and a light source 420. The photosensitive material PF is mounted on the table 410, and the exposing out mask Mb is laid on the photosensitive material PF. The light source 420 illuminates the whole area of the photosensitive material PF. By this exposure operation, the non-printing area UR is exposed out, and thereby printing ink is prevented to be held on the non-printing area in printing operation.

At a step S15, the photosensitive material thus exposed is developed, and thereby a printing plate is completed.

In the above embodiment, the photocomposing operation is performed while using the photocomposing mask Mc and the exposing-out mask Mb, and this facilitates the exposing operation of the paper-ware images and the register marks on the photosensitive material, and the exposing-out operation of the non-printing area other than the paper-ware images and the register marks. The photocomposing mask Mc and the exposing-out mask Mb can be relatively easily fabricated with the paper-ware design system DPS. Accordingly, the total process of the photocomposing operation can be performed without a skilled operator.

Figure 23:
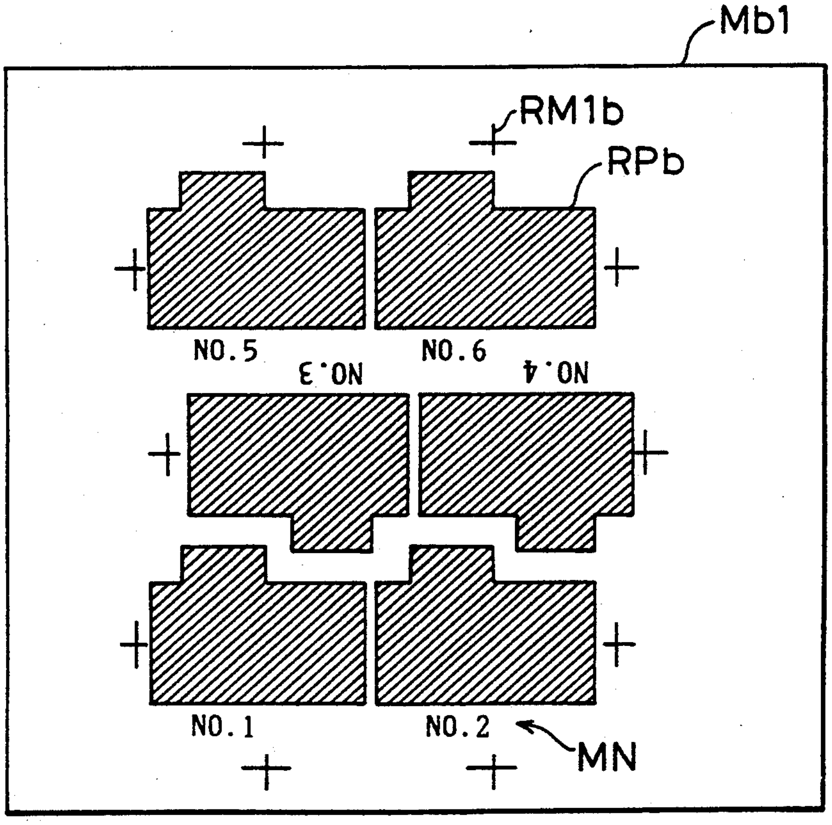
FIG. 23 is a plan view of another example of the exposing-out mask.

Incidentally, on the exposing-out mask Mb, control number masking portions, which are formed in particular shapes representing serial numbers, may be formed adjoining respective image masking portions for masking images I1-I6 of the paper-ware. FIG. 23 is a plan view of an exposing out mask Mb1 including the control number masking portions. In this figure, the control number masking portions MN having the shapes of "No. 1" through "No. 6", respectively, are formed adjoining respective image masking portions for the six printing areas RPb. Each of the control number masking portions MN is placed inside outline L1 of the paper-ware (FIG. 7A) and outside the printing area RPb.

If a photosensitive material is exposed at the step S14 with this exposing-out mask Mb1 overlaid, parts of the photosensitive material under the control number masking portions MN are not exposed, and therefore maintained as areas on the printing plate on which printing ink is held.

The control number is a number which indicates the printing plate and the position of the printing plate at which a paper-ware image is located. By printing paper-ware images with this printing plate, the control number (or reference number) is printed on each paper-ware. If some defect is caused on the paper-ware, the control number facilitates to find out with which printing plate and with which image of the printing plate the defective paper-ware is printed. The control numbers can be arranged in any order, such as the order of the arrangement of the image portions as shown in FIG. 23, or the order of exposure in the photocomposing process with the photocomposer.

Although the present invention is applied to facilitate a printing plate for printing images on paper-ware such as a paper package in the above embodiment, the present invention is applicable to other types of printing plates, such as one used for printing labels for example. In general, the present invention is effective in photocomposing operations which arrange plural images on a printing plate while the rectangles circumscribed about respective plural images partly overlap each other.

The first mask (the photocomposing mask) in the present invention can be relatively easily fabricated on the basis of the shape of the image area, and on the position and the shape of the register marks round the image area. The second mask (the exposing-out mask) can be also easily fabricated on the basis of the arrangement of the images on the printing plate. The desired printing plate can be fabricated by first printing images of paper-ware and register marks on a photosensitive material with the first mask, and by secondly exposing out the area of the photosensitive material other than the images and the register marks. Accordingly, the total procedure of the photocomposing operation can be easily performed without a skilled operator.

When the composing data representing the arrangement of the images on the photosensitive material is utilized in fabricating the second mask, the data for controlling the photocomposer can be easily produced on the basis of the composing data.

Moreover, when the control number masking portions are formed adjoining the image masking portions, printing areas for printing the control numbers useful for quality control are formed on the printing plate.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of printing a plurality of duplicated images of an original image and a plurality of duplicated register marks on a photosensitive material, comprising the steps of:
   (a) preparing an original plate having an original image and a register mark;
   (b) specifying positions and orientations of said plurality of duplicated images to be printed on said photosensitive material with said original plate;
   (c) fabricating a first mask for masking a first masking area other than printing areas on said original plate, said printing areas including at least said original image and said register mark;
   (d) fabricating a second mask for masking second masking areas including at least said plurality of duplicated images and said plurality of duplicated register marks on said photosensitive material;
   (e) printing said plurality of duplicated images and said plurality of duplicated register marks on said photosensitive material according to said positions and orientations while overlaying said original plate with said first mask; and
   (f) exposing said photosensitive material while overlaying said photosensitive material with said second mask, thereby exposing an area on said photosensitive material other than said second masking areas.

2. A method in accordance with claim 1, wherein said plurality of duplicated images are so arranged on said photosensitive material that a plurality of rectangles circumscribed about respective duplicated images overlap partly with each other.

3. A method in accordance with claim 2, wherein
   step (a) comprises a step of producing a first mask data representing masking portions of said first mask;
   step (b) comprises a step of producing a composing data representing said positions and orientations of said plurality of duplicated images; and
   in said step (d), said second mask is fabricated on the basis of said first mask data and said composing data.

4. A method in accordance with claim 3, wherein said step (e) is performed on the basis of said composing data with a photocomposing apparatus which sets said original plate according to each of said positions and orientations of said plurality of duplicated images on said photosensitive material at each step of photocomposing.

5. A method in accordance with claim 4, wherein said original plate has four register marks on four sides of said original image, respectively;

said photocomposing apparatus comprises a masking device having four mask plates movable separately to adjust an aperture therein;

said original plate is so set in said photocomposing apparatus that each of said four register marks are shieldable by respective four mask plates; and said step (e) is performed while a piece of said four register marks which is located at a position to become between said plurality of duplicated images is shielded by a corresponding mask plate of said masking device at each step of photocomposing.

6. A method in accordance with claim 5, wherein said printing areas include an image printing area formed by expanding an area of said original image by a first width, and register-mark printing areas formed by expanding respective areas of said four register marks by a second width; and said second masking areas include image masking areas formed by expanding respective areas of said plurality of duplicated images by a third width, and register-mark masking areas formed by expanding respective areas of said plurality of duplicated register marks by a fourth width.

7. A method in accordance with claim 6, wherein each of said duplicated images is an image to be printed on paper-ware, and layout of developments of said paper-ware is specified on said photosensitive material in said step (b).

8. A method in accordance with claim 1, wherein said second mask includes number-masking areas each of which is located at a prescribed position adjoining the corresponding image masking area, and which represent different numbers from each other.

9. A method in accordance with claim 2, wherein said second mask includes number-masking areas each of which is located at a prescribed position adjoining the corresponding image masking area, and which represent different numbers from each other.

10. A method in accordance with claim 3, wherein said second mask includes number-masking areas each of which is located at a prescribed position adjoining the corresponding image masking area, and which represent different numbers from each other.

11. A method in accordance with claim 4, wherein said second mask includes number-masking areas each of which is located at a prescribed position adjoining the corresponding image masking area, and which represent different numbers from each other.

12. A method in accordance with claim 5, wherein said second mask includes number-masking areas each of which is located at a prescribed position adjoining the corresponding image masking area, and which represent different numbers from each other.

13. A method in accordance with claim 6, wherein said second mask includes number-masking areas each of which is located at a prescribed position adjoining the corresponding image masking area, and which represent different numbers from each other.

14. A method in accordance with claim 7, wherein said second mask includes number-masking areas each of which is located at a prescribed position adjoining the corresponding image masking area, and which represent different numbers from each other.

15. A system useful for printing a plurality of duplicated images of an original image and a plurality of duplicated register marks of a register mark on a photosensitive material with an original plate having said original image and said register mark, comprising:

arrangement means for specifying positions and orientations of said plurality of duplicated images on said photosensitive material;

first-mask-data production means for producing first mask data representing a first mask for masking a first masking area other than printing areas on said original plate, said printing areas including at least said original image and said register mark;

second-mask-data production means for producing second mask data representing a second mask for masking second masking areas including at least said plurality of duplicated images and said plurality of duplicated register marks to be printed on said photosensitive material; and composing-data production means for producing composing data representing said positions and orientations of said plurality of duplicated images.

16. A system in accordance with claim 15, wherein:

said first mask data production means expands an area of said original image by a first width to make up an image printing area, and expands respective ares of said register mark by a second width to make up a register-mark printing area, thereby producing said first mask data representing said first mask area other than said image printing areas and said register-mark printing area; and said second mask data production means expands respective areas of said plurality of duplicated images by a third width to make up said image masking areas, and expands respective areas of said plurality of duplicated register marks by a fourth width to make up said register-mark masking areas, thereby producing said second mask data representing said second mask areas including said image masking areas and said register-mark masking areas.

17. A system in accordance with claim 16, further comprising:

mask fabrication means for fabricating said first mask and said second mask according to said first mask data and said second mask data, respectively.

18. A system in accordance with claim 17, further comprising:

photocomposing means for printing said plurality of duplicated images and said plurality of duplicated register marks on said photosensitive material on the basis of said composing data while overlaying said original plate with said first mask.

19. A system in accordance with claim 18, wherein said photocomposing means comprises a masking device having four mask plates movable separately to adjust an aperture therein, through which aperture said original plate is exposed.

20. A system in accordance with claim 19, further comprising:

exposing-out means for exposing said photosensitive material while overlaying said photosensitive material with said second mask, thereby exposing an area on said photosensitive material other than said second masking areas.

* * * * *